United States Patent [19]

Praglin et al.

[11] 3,832,532
[45] Aug. 27, 1974

[54] METHOD AND APPARATUS FOR TESTING ANTIBIOTIC SUSCEPTIBILITY

[75] Inventors: Julius Praglin, East Lyme; James E. McKie, Jr., Ledyard; Alan C. Curtiss, Old Lyme; David K. Longhenry, East Lyme, all of Conn.

[73] Assignee: Pfizer Inc., New York, N.Y.

[22] Filed: Aug. 18, 1972

[21] Appl. No.: 281,946

[52] U.S. Cl... 235/151.3, 195/103.5 R, 235/151.35, 356/81, 356/103, 356/197
[51] Int. Cl. .................. G06f 15/20, C12k 1/00
[58] Field of Search .................. 235/151.3, 151.35; 250/218; 356/81, 103, 104, 197, 205, 246; 195/103.5 R; 141/325

[56] References Cited
UNITED STATES PATENTS

| | | | |
|---|---|---|---|
| 3,322,956 | 5/1967 | Shah | 195/103.5 R X |
| 3,520,660 | 7/1970 | Webb | 356/179 X |
| 3,531,202 | 9/1970 | Wilkinson et al. | 356/81 |
| 3,551,062 | 12/1970 | Brown | 356/246 |
| 3,553,444 | 1/1971 | Tong | 235/151.35 |
| 3,561,875 | 2/1971 | Ried, Jr. et al. | 356/103 |
| 3,574,063 | 4/1971 | Bowman | 195/103.5 R |
| 3,609,047 | 9/1971 | Marlow | 250/218 X |
| 3,627,424 | 12/1971 | Dorman et al. | 356/103 |
| 3,701,601 | 10/1972 | Plumpe, Jr. et al. | 235/151.35 X |
| 3,718,439 | 2/1973 | Rosse et al. | 250/218 X |

OTHER PUBLICATIONS

Mitz, M. A., "The Detection of Bacteria and Viruses in Liquids," Annals of the New York Academy of Sciences, Vol. 158, 6–1969, pp. 651–664.

*Primary Examiner*—Charles E. Atkinson
*Assistant Examiner*—Jerry Smith
*Attorney, Agent, or Firm*—Connolly & Hutz

[57] ABSTRACT

The light scattering of a number of aliquots of a given bacterial/broth suspension, each containing a different antibiotic are rapidly measured and compared with the forward light scattering of a control suspension of the bacteria in the absence of antibiotic. The inhibitory effectiveness of each antibiotic on the growth of the bacteria is then computed from the substantially simultaneous readings and printed out. The bacterial/broth suspension samples are conveniently deposited in a disposable, plastic, transparent, compartmented container or cuvette into which antibiotic discs are introduced into all but one compartment (chamber) from a ganged disc dispenser. After a brief agitated incubation period of about three hours, the covette is inserted in a photometric analyzer which measures the intensity of light scattered at some angle to the incident beam by each sample chamber and compares it with the light scattered at the same angle by the control chamber to which no antibiotic has been added. The relative effectiveness of each antibiotic is computed and recorded to determine which of the antibiotics is most suitable for treating the patient. The partitioned cuvette includes a filling reservoir from which the inoculated broth is introduced as equal volume aliquots into the interconnected lobes of a row of double lobed chambers. Rotation of the partitioned cuvette transfers the equal volumes of broth inoculum from the interconnected lobes to the transparent and separated lobes of the chambers. Then different antibiotic discs are simultaneously dropped within apertured tubes which are located within all chambers except the control chamber. Elution of the antibiotics into the liquid samples begins immediately. The cuvette is then placed in an incubator/shaker for approximately 3 hours at approximately 36°C to promote bacterial growth and antibiotic elution. The light scattering readings are obtained at the end of the agitation/incubation period and the relative antibiotic effectiveness computed in an analyzer into which the cuvette is inserted and indexed past a light source. The light passes through a lens system which directs a beam of light successively through the transparent lobes of the cuvette. The readings are obtained at a predetermined angle of scatter of, for example, 35°. Initial analog signals are converted to binary digits and logarithms to simplify normalization of the antibiotic-mediated inhibition of bacterial growth by the total growth in the control chamber. The normalized growth inhibition values are printed out and rated on a scale of 0 (no inhibition, total resistance) to 100 (complete inhibition, total susceptibility). In addition the total growth, which has occurred in the control chamber during the agitation/incubation period, is printed out as a logarithmic difference (growth index).

If insufficient growth has occurred in the control chamber (growth index less than 0.9), the cuvette may be reincubated and reread before disposal.

29 Claims, 36 Drawing Figures

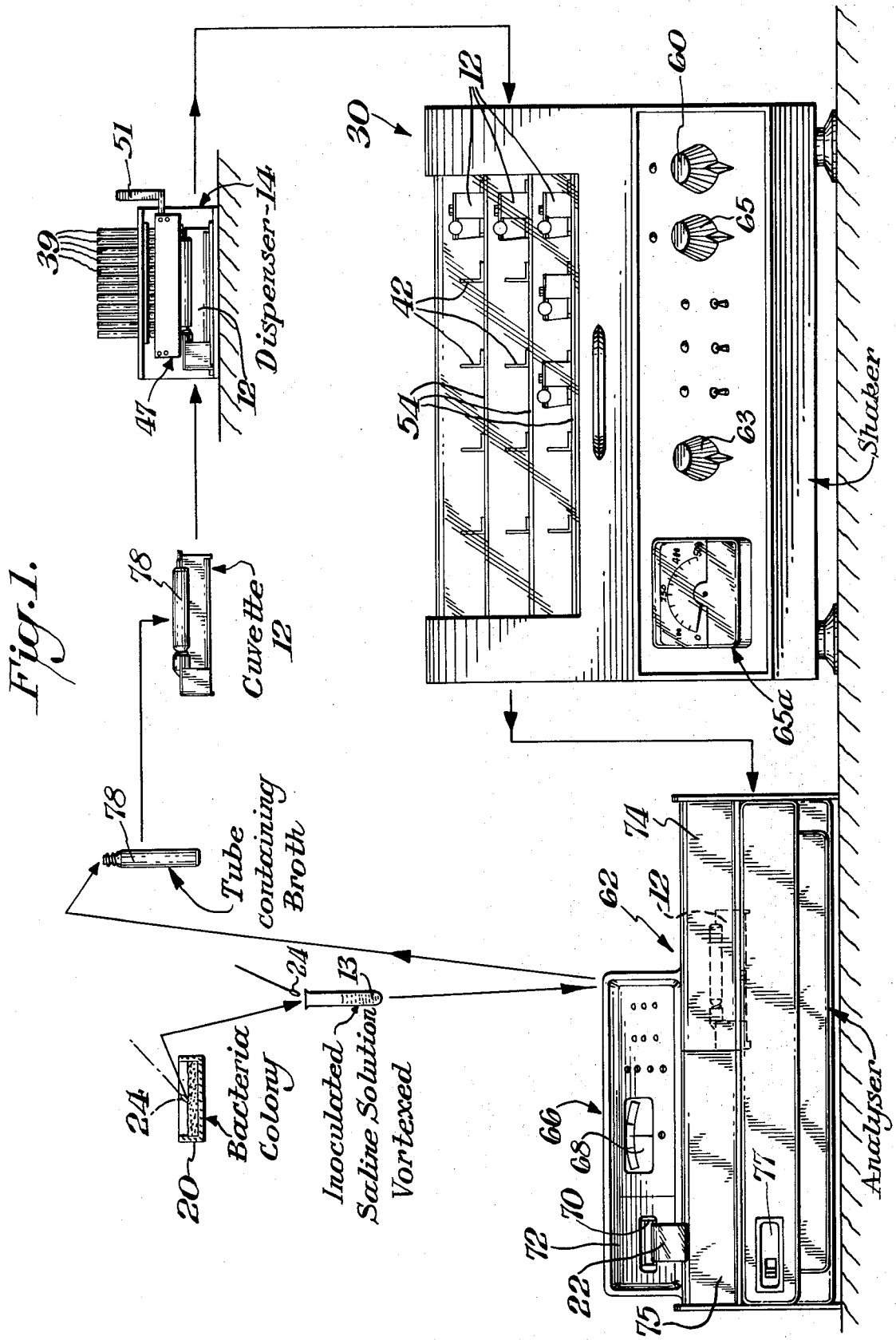

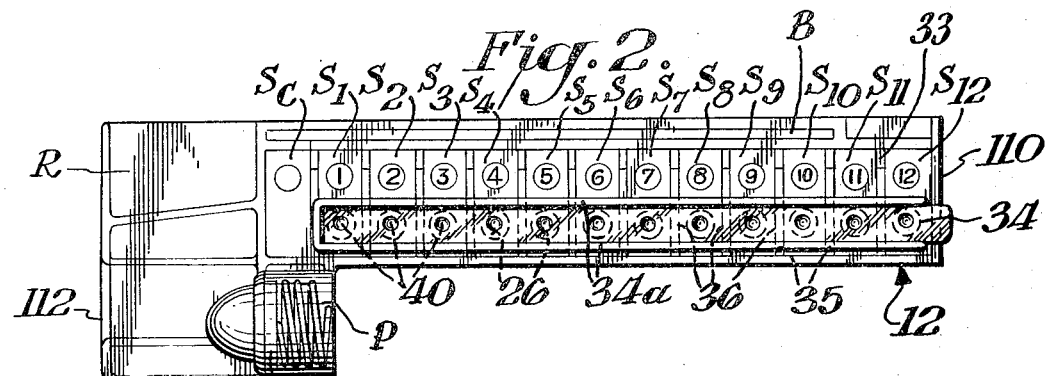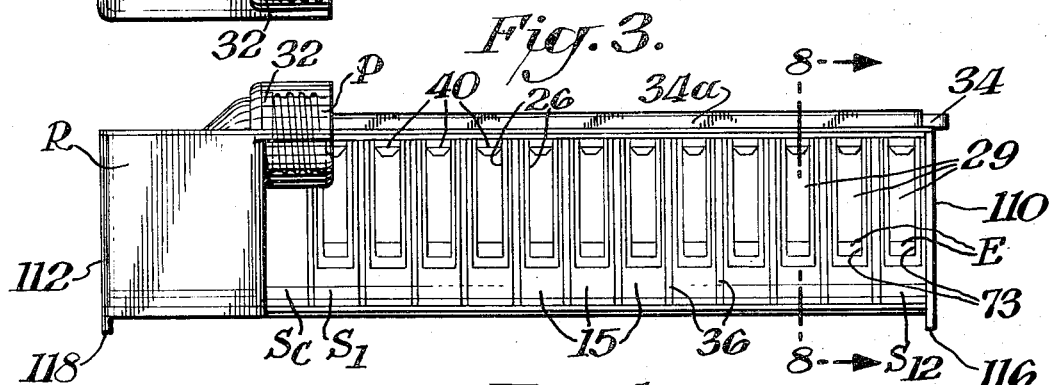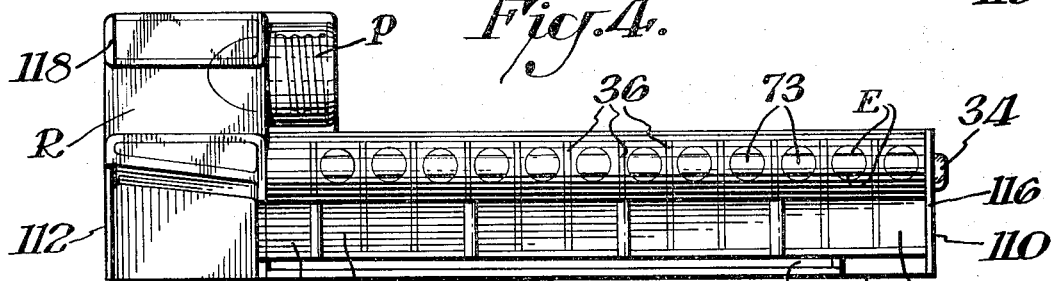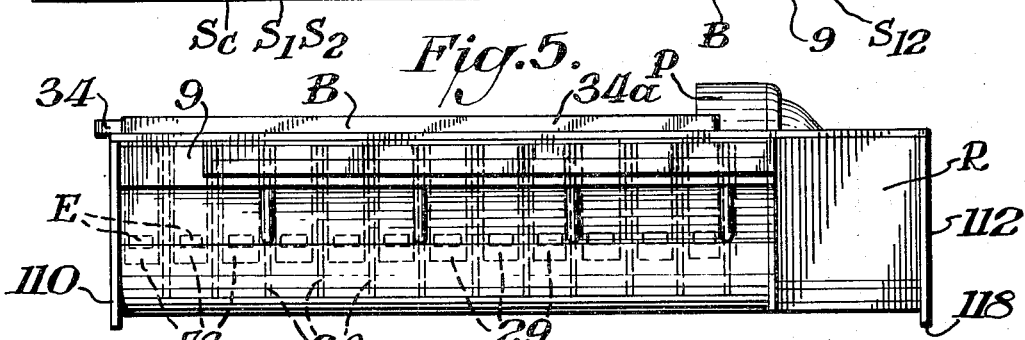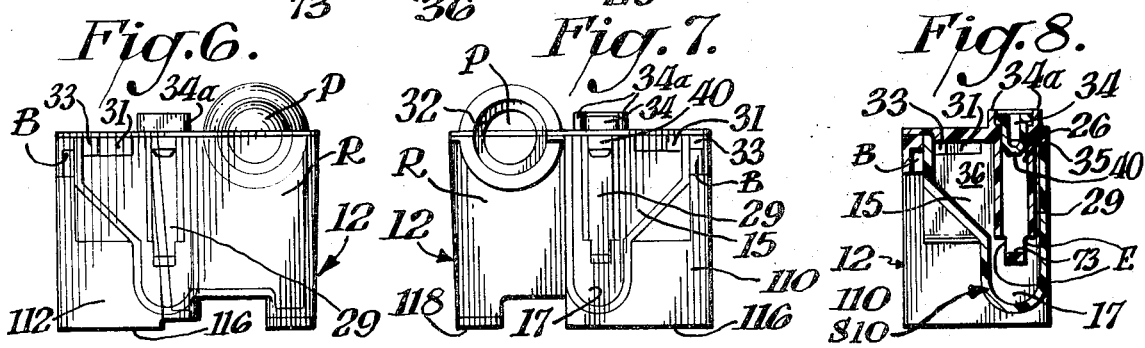

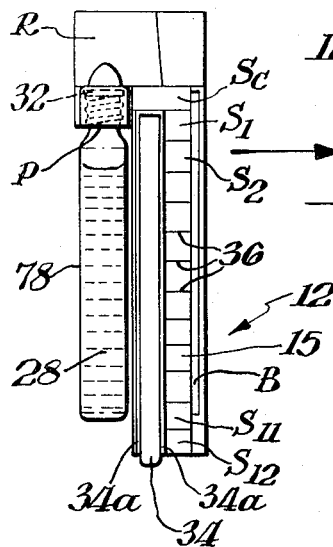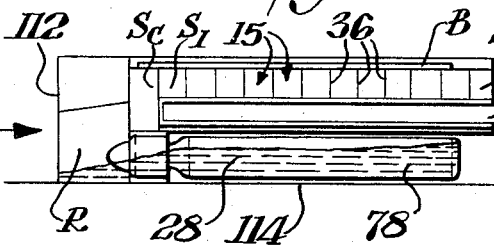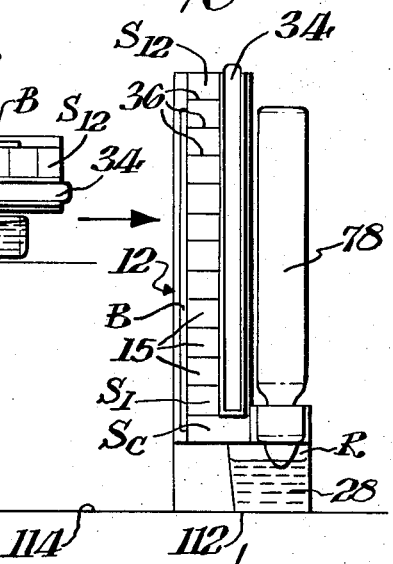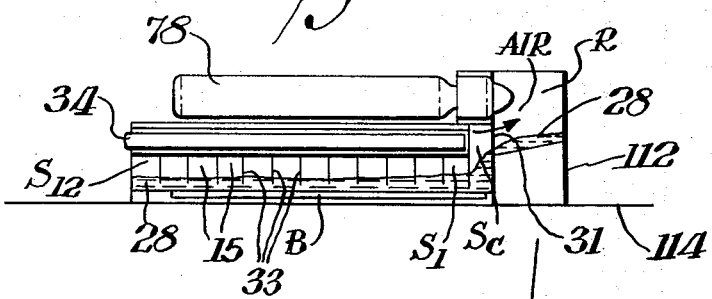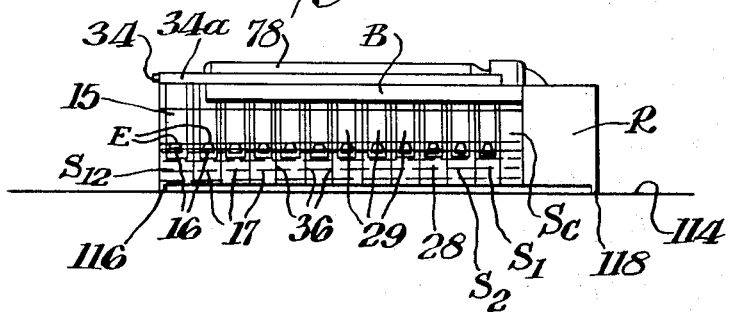

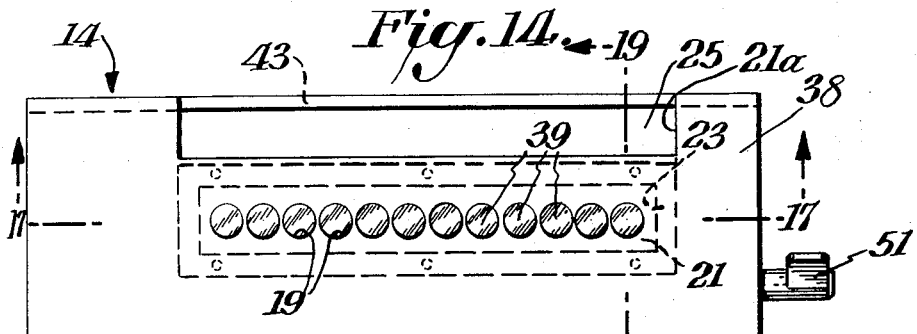
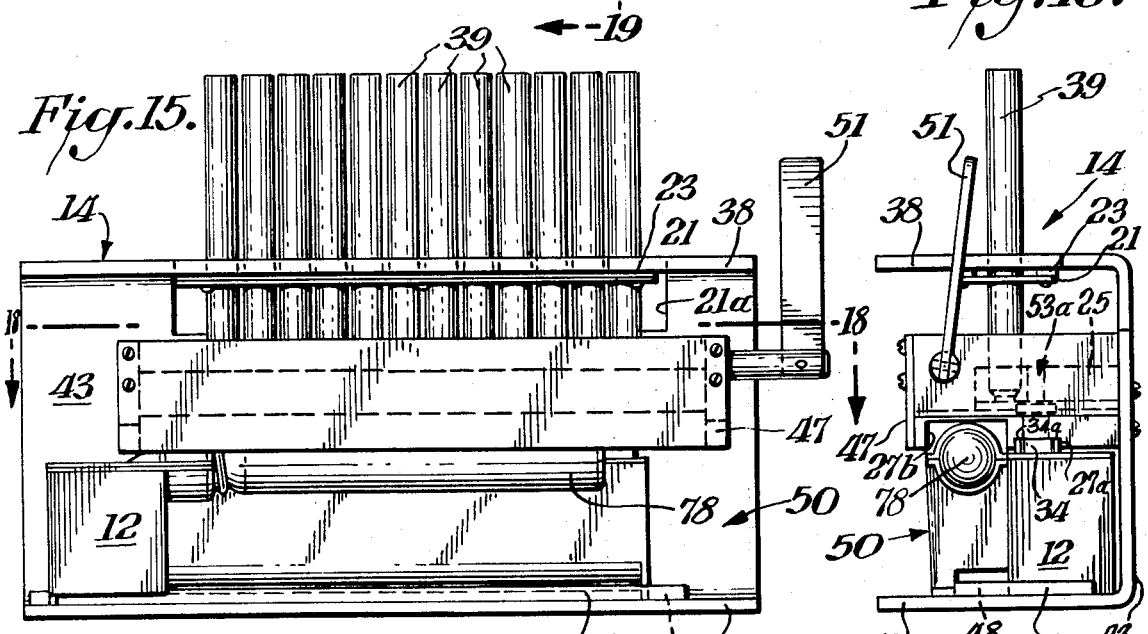
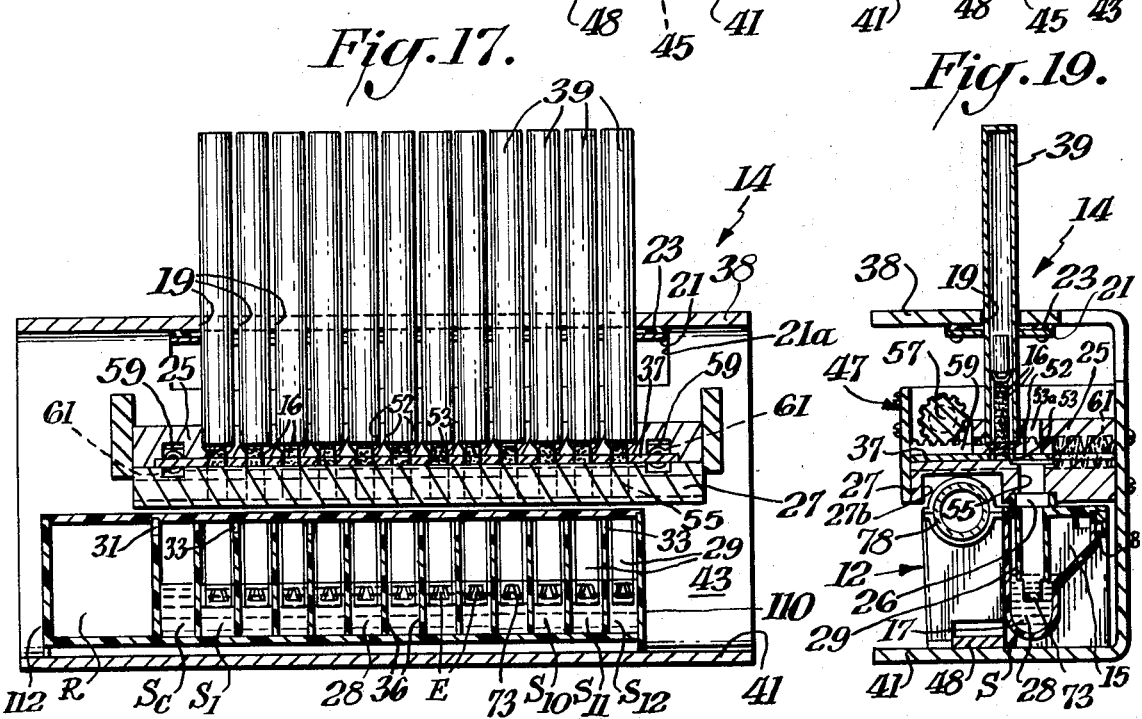

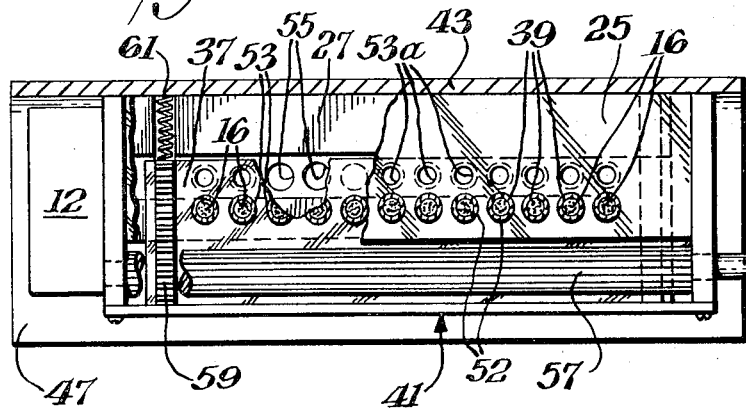
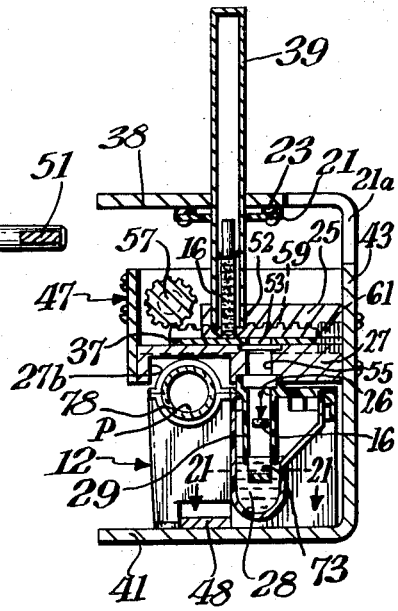
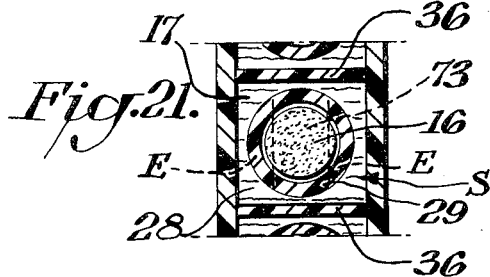
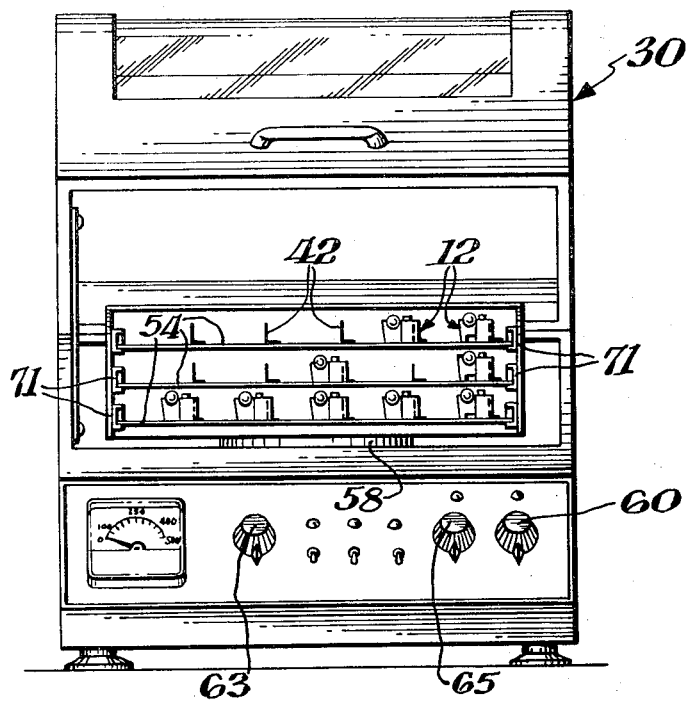
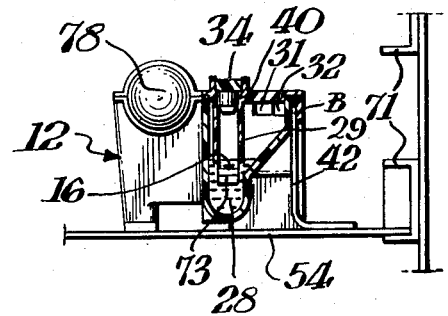

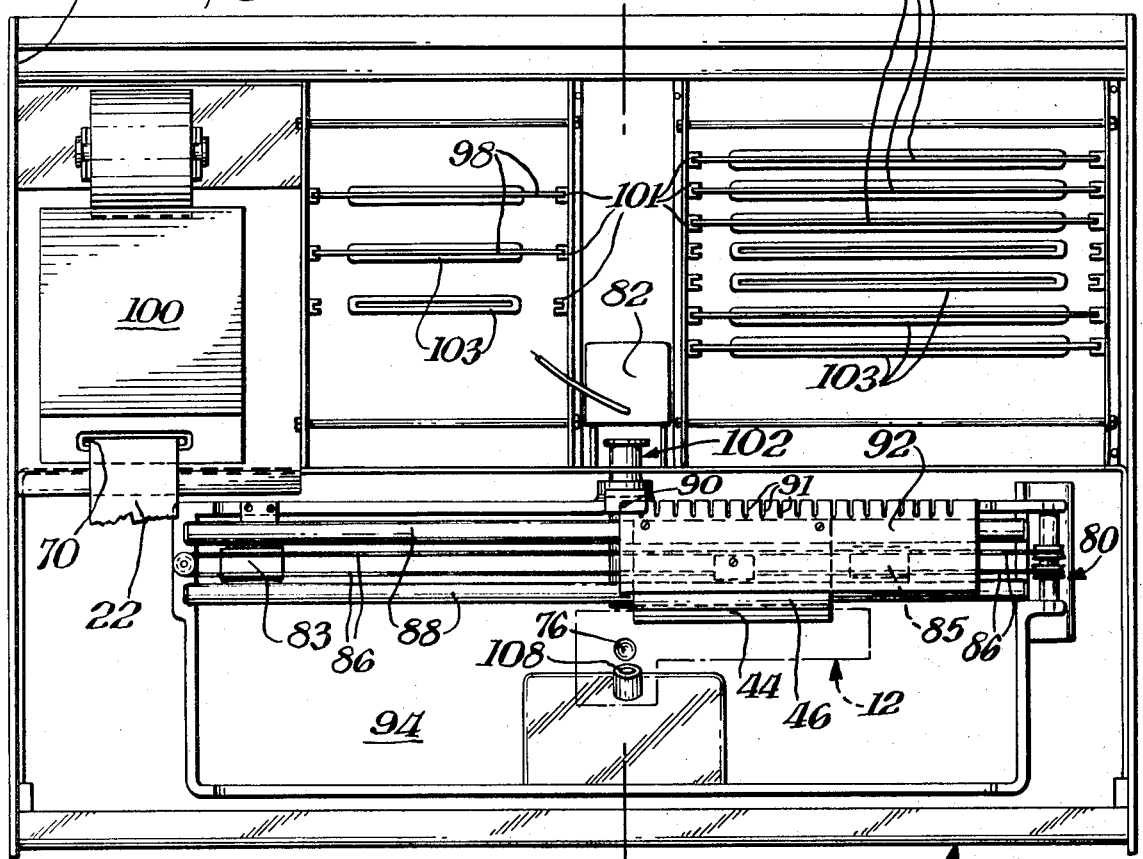
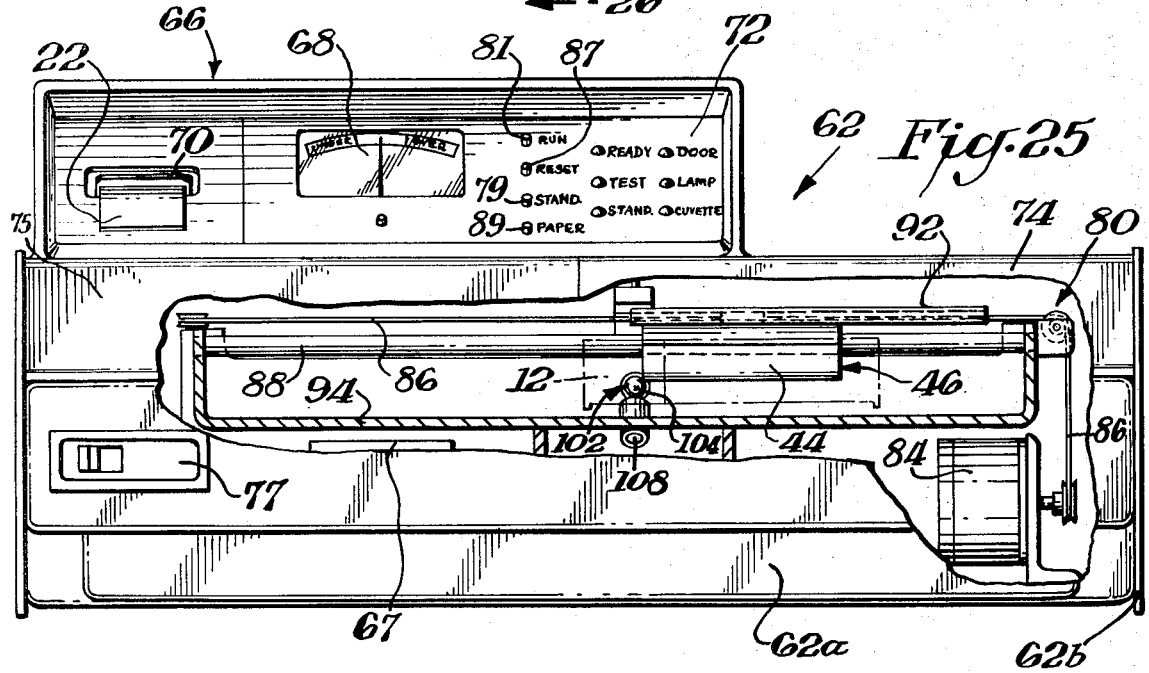

Fig. 35. *Program Listing*

| Operation | Location | Instruction | Resp. | Clr.A | LoadA | LoadB | GateA | GateB | SL1 | SL2 | SL3 | SL4 | Clr.BCD | PL2 | Next Instruction |
|---|---|---|---|---|---|---|---|---|---|---|---|---|---|---|---|
| 0→A, D→B | 0000 P₀ | 01 | 1 | 1 | 0 | 1 | 1 | 0 | 0 | 0 | 0 | 0 | 1 | 1 | P+1 |
| B→A | 0001 P₁ | 01 | 1 | 0 | 0 | 1 | 0 | 0 | 0 | 0 | 0 | 0 | 0 | 1 | P+1 |
| Test OVF | 0010 P₂ | 10 | 0 | 0 | 0 | 0 | 0 | 1 | 0 | 0 | 0 | 0 | 0 | 0 | OVF=JMP4;OVF̄=P+2 |
| A-1 → A | 0011 P₃ | 01 | 0 | 0 | 1 | 0 | 1 | 1 | 0 | 1 | 1 | 0 | 0 | 0 | JMP P-1 |
| Pause | 0100 P₄ | 00 | 0 | 1 | 0 | 0 | 0 | 0 | 0 | 0 | 0 | 0 | 0 | 0 | GI=JMPφ; II = P+1 |
| (Dn×4)→A | 0101 P₅ | 01 | 0 | 0 | 1 | 0 | 0 | 1 | 1 | 0 | 0 | 1 | 1 | 0 | P+1 |
| (Dn×32)+A→A | 0110 P₆ | 01 | 0 | 0 | 1 | 0 | 1 | 1 | 1 | 1 | 1 | 0 | 0 | 0 | P+1 |
| (Dn×64)+A→A | 0111 P₇ | 01 | 0 | 0 | 1 | 0 | 1 | 1 | 1 | 1 | 0 | 1 | 0 | 1 | P+1 |
| Test OVF | 1000 P₈ | 10 | 0 | 0 | 0 | 0 | 0 | 1 | 1 | 0 | 0 | 0 | 0 | 0 | OVF=JMP4;OVF̄=P+1 |
| A-B→A | 1001 P₉ | 01 | 0 | 0 | 1 | 0 | 1 | 1 | 0 | 0 | 0 | 0 | 0 | 0 | JMP P-1 |

Columns Resp. through PL2 are grouped: Clr.A through PL2 form two groups labeled $\dfrac{B}{1}$ and $\dfrac{D \times 100_{10}}{B}$.

METHOD AND APPARATUS FOR TESTING ANTIBIOTIC SUSCEPTIBILITY

BACKGROUND OF THE INVENTION

Hospital clinical laboratories have the problem of determining the antibiotic to which pathogenic bacteria isolated from a particular patient is most susceptible. The Kirby-Bauer procedure described in an article entitled "Disc Susceptibility Testing" printed in "Hospital Practice" February 1970, Vol. 5, No. 2, pages 91–100, measures a zone of inhibition about an antibiotic disc in a gel containing the bacteria. It requires about one day to complete and involves considerable handling, labor time and exposure to the pathogenic bacteria. A highly automated particle-counting system is described in Applied Microbiology, December 1971, pages 980–986. It provides results in a few hours but is extremely complicated and expensive and kills the bacteria, thus precluding repetition. Light scattering photometers with laser beams have also been used to study changes in a scattering curve obtained by a rotating detector to determine susceptibility of bacteria to different antibiotics. Such systems and devices are based upon cell size/shape changes and not inhibition of growth (upon which valid conclusions can be drawn regarding bacterial susceptibility), require highly skilled analysis and are relatively expensive. An object of this invention is to provide a relatively simple and economical method and apparatus for antibiotic susceptibility testing which is not only based upon accepted and verified principles of antibiotic susceptibility testing but is also rapid, efficient, economical in time and equipment, direct reading, simple to operate by ordinary laboratory technicians and which permits rerunning for verification.

SUMMARY

In accordance with this invention the effectiveness of a number of different antibiotics is determined by simultaneously adding the antibiotics to a number of identical samples of a given bacterial suspension. The samples are then incubated for the minimum time necessary to develop significant differences in the inhibitory effect of each of the antibiotics on the growth rate of the bacteria in each of the samples. The elution of the antibiotics during the incubating period is advantageously standardized by uniform shaking during the incubation. The agitation also permits the uniform suspension of the multiplying cells and retards bubble formation in the scattering chambers. The inhibiting effect of the different antibiotics in the samples is then photometrically analyzed and compared with the control sample without antibiotic to determine the relative effectiveness of the different antibiotics. Preparation, antibiotic addition and photometric analysis of the samples is remarkably facilitated by depositing them in a transparent compartmented container or cuvette in which antibiotic discs are simultaneously introduced from a ganged disc dispenser. The cuvette may advantageously include a filling reservoir at one end of a row of double lobed chambers — each lobe of which is connected with each other by interdisposed vents and connecting ports. The interconnected lobes are rotated down on their sides to equally fill them with the bacteria suspension transferred from the reservoir to the lobes through the lower connecting ports of the lobes in conjunction with the upper vents of the lobes. When the cuvette is then rotated to position the interconnected lobes in an upright position, the sample solution flows from the interconnected distribution lobes into the disconnected testing lobes. The antibiotic discs are conveniently dropped into each of the testing lobes within apertured tubes extending through the top walls and such discs are thereby held immersed a short distance into the bacterial suspension trapped within the testing lobe of each chamber. The antibiotic discs may be added before or after the inoculum as practical considerations dictate. The cuvette also may be the same or similar to that described in U.S. Pat. No. 3,304,965. The testing lobes are optically transparent and shaped to facilitate rapid photometric analysis, such as by rapidly indexing them past a light source and photometric detector — advantageously of the light scatter detecting type. Photometric analysis is advantageously performed in an indexing analyzer, which may include a computing section to convert analog photometric signals to logarithms and then to binary digits for highly simplifying determination of growth index ratios and growth inhibition index ratios the latter of which are printed out and rated on a convenient scale, such as from 0 – 100. If the determined growth index ratio is too low, the cuvette may be reincubated and reread before disposal. The computing is further advantageously performed by providing a sequence of operations from a read only memory to perform a division in binary scaled in a base ten manner to achieve a resultant answer in a binary coded decimal. A highly simple sequence of such character is provided by the program set forth in FIG. 35.

BRIEF DESCRIPTION OF THE DRAWINGS

Novel features and advantages of the present invention will be become apparent to one skilled in the art from a reading of the following description in conjunction with the accompanying drawings wherein similar reference characters refer to similar parts and in which:

FIG. 1 is a partially schematic diagram of apparatus associated to perform the method of this invention and some of which comprise embodiments of apparatus aspects of this invention;

FIG. 2 is a top plan view of the cuvette portion of the apparatus shown in FIG. 1 which is an important apparatus aspect of this invention;

FIG. 3 is a front view in elevation of the cuvette shown in FIG. 2;

FIG. 4 is a bottom plan view of the cuvette shown in FIGS. 2 and 3;

FIG. 5 is a rear view in elevation of the cuvette shown in FIGS. 3 and 4;

FIG. 6 is a left end view of the cuvette shown in FIGS. 2 and 3;

FIG. 7 is a right end in elevation of the cuvette shown in FIGS. 2 and 3;

FIG. 8 is a cross-sectional view taken through FIG. 3 taken along the line 8—8;

FIGS. 9–13 are partially schematic views of successive steps in filling the cuvette shown in FIGS. 2–8 from a supply tube;

FIG. 14 is a top plan view of a ganged disc dispenser for use in the performance of the method of this invention and which comprises one apparatus aspect of this invention;

FIG. 15 is a front view in elevation of the dispenser shown in FIG. 14;

FIG. 16 is a right end view of the dispenser shown in FIG. 15;

FIG. 17 is a cross-sectional view taken through FIG. 14 along the line 17—17;

FIG. 18 is a cross-sectional view taken through FIG. 15 along the line 18—18;

FIG. 19 is a cross-sectional view taken through FIG. 14 along the line 19—19 with the dispenser in the ready position;

FIG. 20 is a cross-sectional view similar to FIG. 19, but in the dispensing position;

FIG. 21 is a cross-sectional view taken through FIG. 20 along the line 21—21;

FIG. 22 is a front view in elevation of the incubator-shaker apparatus used in the method of this invention with its door open;

FIG. 23 is an enlarged end view of a cuvette inserted and mounted within the incubator-shaker shown in FIG. 22;

FIG. 24 is a top plan view of an analyzer with cover removed which is an embodiment of an important apparatus aspect of this invention and used in the method of this invention;

FIG. 25 is a front elevational view of the analyzer shown in FIG. 24 partially broken away to show the inserted cuvette and carriage for indexing it within the analyzer;

FIG. 35 is a schematic diagram of an illustrative program for the read only memory block in FIG. 33.

DESCRIPTION OF THE PREFERRED EMBODIMENT

Figure 26:
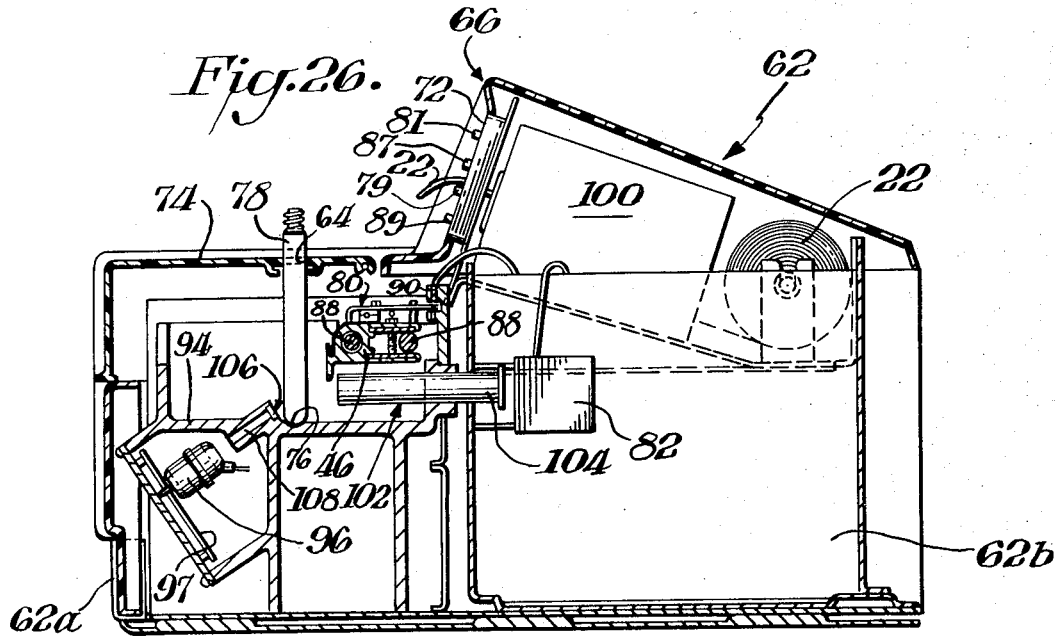
FIG. 26 is a cross-sectional side elevational view taken through FIG. 24 along the line 26—26 showing a supply tube inserted for preliminary minimum bacteria colony content test.

As shown in FIG. 1, system 10 for determining the relative effectiveness of a number of different antibiotics (12 for example) to inhibit the growth of bacteria includes: a disposable plastic cuvette 12 in which the susceptibility tests are performed, a disc dispenser 14 for inserting discs 16 into cuvette 12, an incubator-shaker 30 for incubating and agitating the cuvettes and an automatic light-scattering photometer analyzer 62 for evaluating bacterial growth and printing the results on a preprinted form or tape 22 as later described in detail.

Prior to the test procedure described herein in detail, a clinical isolate is obtained, transferred to a Petri dish 20 and incubated overnight. Several colonies of similar morphology are then picked from the plate by the bacteriologist using loop 24 and suspended via vortexing in saline solution in tube 13. By use of the photometer instrument's standardizing mode, the susupension in tube is made up to a standard bacterial concentration which is checked in analyzer 62 by insertion in port 64 in cover 74 and read on meter 68. Two ml. of the above suspension is added to 18 ml. of eugonic broth in a screw top test tube 78. Test tube 78 screws on to plastic cuvette 12, and a simple manipulation transfers the test tube contents evenly to 13 cuvette test compartments $S_c$ and $S_{1-12}$. Elution discs 16 are now added through ports 26, uncovered by removal of closure 34, by disc dispenser 14 and are held suspended in the growth medium 28 in 12 disconnected lobes 17 of chambers $S_{1-12}$ by plastic tubular fingers 29 in the cuvette top. The thirteenth chamber $S_c$ is the control. Cuvette 12 is now incubated for 3 hours in an incubator-shaker 30 designed to hold up to 30 cuvettes. At the end of 3 hours, a cuvette 12 is inserted in analyzer instrument 62, and the growth in each chamber $S_c$ and $S_{1-12}$ is evaluated. By comparison to the control chamber $S_c$, the relative inhibitory effect of each antibiotic in $S_{1-12}$ is calculated and printed as later described in detail.

The eugonic broth has the following composition in grams per liter and a pH of 7.0

| Constituent | Content |
| --- | --- |
| Peptone "C" | 15.0 |
| Peptone "S" | 5.0 |
| Dextrose | 5.5 |
| Sodium Chloride | 4.0 |
| Sodium Sulfite | 0.2 |
| l-Cystine | 0.7 |

Details of the four components of system 10 are as follows:

A. Cuvette 12

The measurement of the effect of antimicrobial agents on the growth of microorganisms in broth requires a chamber (cell) to contain the inoculated broth. The detection of growth in broth by forward light scattering requires such a chamber to be both optically transparent to the irradiating light used and geometrically consistent with the light scattering photometer. Convenient and rapid examination of the effect of many antimicrobial agents on the growth of a given microorganism is accomplished by a linear array of such optical chambers as a single unit. Cuvette 12 also permits the convenient introduction of an equal volume of broth incoculum into each chamber S. Cuvette 12 also has the capability of conveniently accepting an antimicrobial impregnated paper disc into all test chambers and is not capable of accepting such an antimicrobial disc in its single control chamber. Furthermore, cuvette 12 is water-tight, optically polished, optically reproducible, inexpensive, relatively small, stackable, and may be disposable.

Cuvette 12 is shown in FIGS. 2–8. It is composed of optically clear and inert plastic, such as polystyrene, and is produced by the injection molding process in two sections using optically polished steel molds. After injection molding, the two sections are sealed together by either solvent or ultrasonic energy to produce the cuvette. Ultrasonic sealing is preferable because it avoids marring of the optical surface by excess solvent. Cuvette 12 is a linear array of one control chamber, $S_c$, and twelve antimicrobial test chambers, $S_{1-12}$. The only other material besides polystyrene used in the illustrated cuvette 12 is a flexible polymer, such as Krayton. Krayton is the trademark for a styrene-butadiene polymer made and sold by the The Shell Chemical Co. Krayton gasket 32 and a closure 34 are inserted into cuvette 12 prior to final packaging.

Cuvette 12 includes six parts:

1. Inoculum tube port (P) (FIGS. 2–7)

A threaded orifice which accepts an 18–415 threaded tube 78, containing inoculated broth. A Krayton gasket 32, positioned at the base of the port provides a water-tight seal between the cuvette and inoculum tube.

2. Reservoir (R) (FIGS. 2–7)

It accepts the broth inoculum from the inoculum tube by manually rotating the cuvette.

3. Interconnected Distributing Lobes 15

A row of lobes 15 extends the entire length of the long axis of the cuvette (excluding the reservoir). They are connected to the reservoir by a major distribution port 31, and accept broth inoculum from the reservoir by manually rotating the cuvette to lower them and cause equal amounts of solution to fill them through distributing ports 33 assisted by return flow of air through vents 35. The area of ports 33 increases away from reservoir R.

4. Light Scattering Lobes 17 (FIGS. 7 and 8)

Thirteen disconnected light scattering lobes 17 of chambers $S_c$, ($S_1$, $S_2$ ... $S_{12}$) accept an equal volume of broth inoculum from interconnected distributing lobes 15 by manually rotating the cuvette 90° about its long axis to lower them. Once filled with broth inoculum the 13 chambers S are isolated from each other by the partitioning walls 36. Distributing ports 33 and air distribution vents 35, located at the top of each partition 36 and well above the broth level are the only interconnections between the chambers. These vents are necessary for proper fluid distribution into lowered distributing lobes 15 as described above.

5. Tubular Antimicrobial Disc Holders (29) (FIGS. 7, 8 and 21)

Twelve apertured tubular fingers 29 extend down into the twelve test scattering chambers ($S_1$, $S_2$ ... $S_{12}$). Each hollow finger, known as a disc holder, accepts an antimicrobial paper disc 16 (6.5 mm diameter) via 12 disc ports 26 on the top surface of cuvette 12. The disc drops into the disc holder 29 and comes to rest on the floor 73 of this holder. Two elution ports, E, in the walls of the disc holder adjacent to the disc permit elution of antimicrobial agent into the surrounding broth innoculum of the scattering chamber. A strip 34 of Krayton with twelve nipples 40 (called the closure inserts) into the disc ports 26 to provide a watertight seal for each disc holder. Strip 34 is received between parallel rails 34a straddling ports 26 on the upper surface of cuvette 12.

6. Bracket B (FIGS. 2 and 4–8)

An L-shaped bracket B located on the back of cuvette 12 and extending the length of the cuvette long axis enables the attachment of the cuvette to holding brackets 42 in the incubator-shaker 30 and to the holding bracket 44 of the photometer carriage 46. Cuvette bracket B thereby enables correct positioning of the cuvette during both the incubation-agitation period and the photometric scanning period.

B. Disc Dispenser

Disc dispenser 14 shown in FIGS. 14–20 conveniently and rapidly introduces a single antimicrobial impregnated paper disc 16 into each of the twelve (or less if desired) disc holders 29 with the entire panel of discs added simultaneously by a simple manual manipulation. The upper plate section 38 of the free-standing dispenser 14 accepts a maximum of 12 cartridges 39 containing antimicrobial discs 16. Glass cartridges 39 are identical to those currently being used for Kirby-Bauer discs. The lower plate section 41 of dispenser 14 contains a track guide 48 which accepts a cuvette 12 in upright position. Upper plate 38 and lower plate 41 are joined on a channel form by rear vertical wall 43. Cuvette 12 is inserted on track 48 into cavity 50 until stop 45 is reached. The top of cuvette 12 is guided by insertion of the the parallel rails 34a in slot 27a in the bottom of plate 27 later described. Another slot 27b is provided in the bottom of plate 27 for passage of inoculum tube 78. The middle section 47 of the dispenser 14 has mechanism 49 somewhat similar to that shown in U.S. Pat. Nos. 3,031,819, 3,036,703 and 3,115,992, which upon actuation of a lever 51, slides a single disc 16 out of each cartridge 39 and drops the disc 16 intp the tubular disc holder 29 of the cuvette. In this manner, twelve discs can be simultaneously added to a cuvette.

Cartridge tubes 39 are inserted through holes 19 in upper plate 38 and adjacent support plate 21 and spacer plate 23. Midsection 47 includes spaced horizontal guide plates 25 and 27 between which slide plate 37 reciprocates. Upper plate 25 includes counterbored holes 52 which receive the bottom ends of cartridge 39. Slide plate 37 includes holes 53 which receive discs 16 from tubes 39 and drop them through holes 55 in plate 27 into ports 26 in cuvette 12. Viewing slot 21a allows user to monitor operation and to easily clear jamming through holes 53a in plate 25 caused by any malfunction, such as of a disc 16 in a hole 55 in plate 27. Plate 37 is reciprocated by lever 51 through splined shaft 57. Racks 59 energizing splined shaft 57 are connected to the ends of slide plate 37 to move it back and forth by lever 51. Compression springs 61 react between vertical wall 43 and the rear edge of slide plate 37 to return it to the receiving position.

Although the disc method of dispensing antibiotics to the broth inoculum is advantageous because of convenience, other methods of antibiotic introduction such as lyophilized powder addition or solution addition are possible.

C. Incubator-Shaker 30 (FIGS. 22 and 23)

The effect of an antimicrobial agent on a broth inoculum is normally measured in an in vitro system incubated at 35°–37°C. During such an incubation, mild agitation: (1) insures rapid elution of antimicrobial agent from the paper disc (i.e., in less than 10 minutes most antibiotics elute 100 percent of their nominal value); (2) enables new organisms formed in the growth process to be suspended in the broth rather than appearing as growth on the walls or at the meniscus where they are unavailable for proper light scattering detection;

and (3) avoids the formation of bubbles which occur on the chamber walls when certain organisms multiply. The dual requirements of incubation and agitation are, therefore, satisfied most uniquely by combination incubator-shaker 30 and the cuvette 12 design.

The incubator-shaker, shown in FIGS. 22 and 23, is a modified form of that described in U.S. Pat. Nos. 3,002,895 and 3,430,926. It accepts up to thirty cuvettes in three interchangeable racks 54. Each rack 54 has ten brackets 42 for holding cuvettes via the cuvette bracket B. The three racks 54 are securely locked into position in channel brackets 71 on a platform 58 which rotates at a predetermined frequency and amplitude. A 220 rpm circular rotation of ¾ inch diameter amplitude has been determined to be the best agitation conditions enabling good antimicrobial disc elution and organism suspension while at the same time preventing chamber to chamber cross contamination of broth inoculum via the upper ports and air vents in the cuvette. The rotational agitation of the cuvettes takes place in a chamber maintained at $36 \pm 0.5°C$. by an on-off temperature controller. A safety thermostat 60 is incorporated into the incubator to provide a back-up temperature control system in the event of failure of the main thermostat. Although the present incubator-shaker 30 has the capability of variable rotational frequency through speed control knob 63 and variable temperature through temperature control knob 65, in the preferred form of the device. Knobs 60, 63 and 65 and meter 65a may be removed and operation may be performed at the preferred rotational rate of 220 RPM and temperature of $36 \pm 0.5°C$.

D. Photometer Analyzer 62

1. Function

Photometer analyzer 62 has four principal functions: (1) inoculum standardization to provide the means for determining when the microbial concentration of the starting saline stock inoculum is within relatively narrow and well defined limits (e.g., 1 to $3 \times 10^7$ cells/milliliter); (2) to provide the means for determining the level of growth in all scattering chambers of the incubated cuvette; and (3) to calculate and print out for each scattering chamber containing an antimicrobial, a reading which is readily interpretable in terms of the susceptibility or resistance of the microorganism to the antimicrobial agent.

2. Exterior

FIG. 25 shows a front view of the instrument 62 with doors 74 and 75 closed. The control panel 66 with the inoculum meter 68 and printer slot 70 is contained in instrument housing 72. The doors 74 and 75 give access to cuvette carriage chamber 46. A port 64 in the right door 74 is provided for inserting inoculum tube 78 with its lower end resting within indentation 76 in casting 94. Normally only the right door 74 is opened. The left door 75 is provided for maintenance purposes. On the left side below the door 75 is the instrument power switch 77. Instrument cover 66 and instrument front 62a are fabricated from 5/32 inch ABS plastic while the doors 74, 75 and front panel 72 and frame 62b are steel or aluminum.

3. Interior

Figure 27:
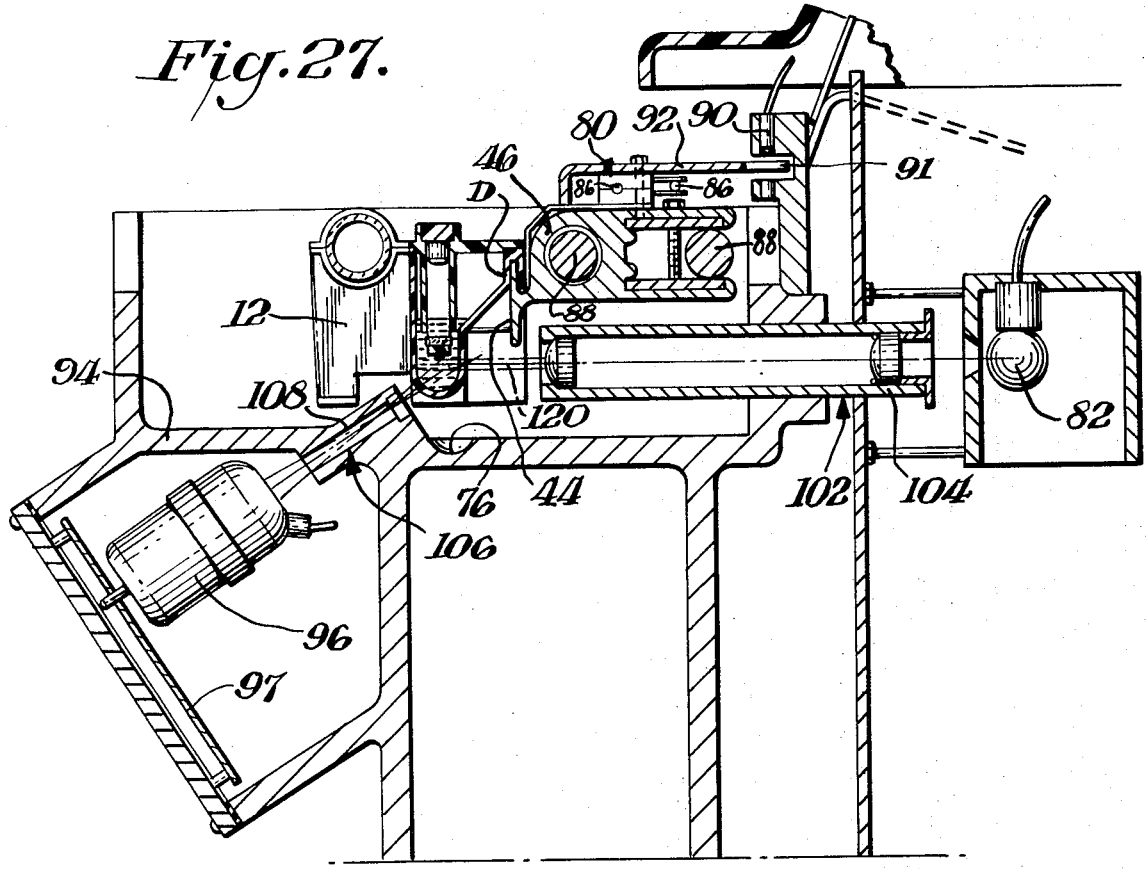
FIG. 27 is a cross-sectional side elevational view similar to FIG. 26 showing the cuvette being scanned.

Refer to FIGS. 24–25 and 27 showing instrument 62 with cuvette 12 in place. Cuvette drive mechanism 80 traverses cuvette 12 from right to left past photometer light source 82 and the optical system 102. This mechanism employs a motor 84 linked via a cable 86 to carriage 46 sliding on parallel bars 88. Limit switches 83 and 85 actuate forward or reversing movement of motor 84. An optical sensor 90 on the instrument senses the cuvette position by reading index slots 91 in a slide 92 mounted on carriage 46 (FIG. 24).

FIG. 25 shows instrument 62 from the front with covers broken away. Transformer 67 is on the lower left and drive motor 84 is on the right. In the center is the main casting 94 which holds the drive mechanism 80. The photometer transducer 96 is in its base.

Figure 28:
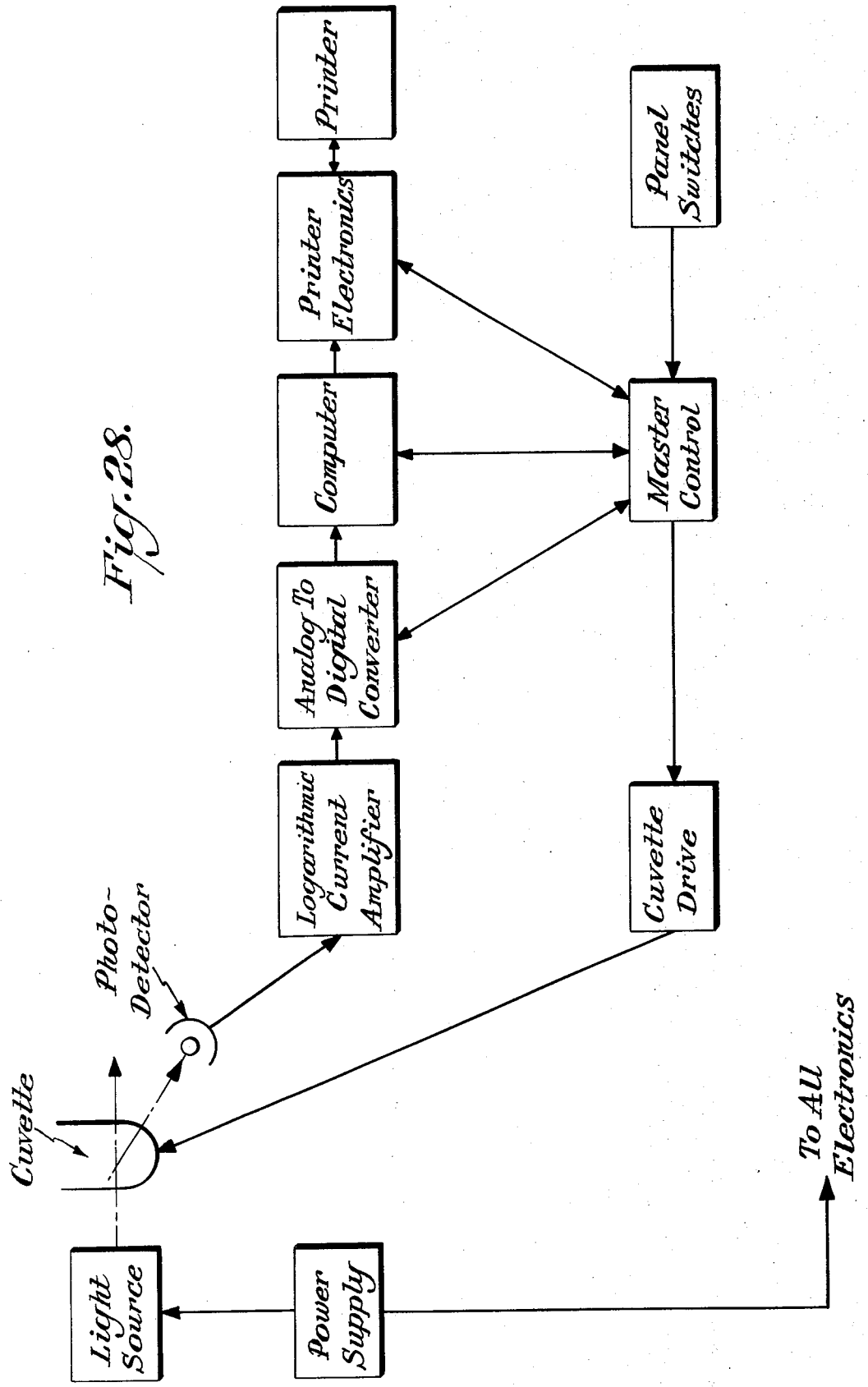
FIG. 28 is a block diagram of the electronic system.

FIG. 24 shows printed circuit cards 98 and 99 occupying the rear of instrument 62. To the left of cards 98 is printer 100. In the center is the light source 82 and optical system 102. Optical system 102 employs a Quartz Halogen lamp 82 and a simple two lens condensing system 104. Receiver 106 uses a collimator tube 108 placed at a 35° angle as shown in FIG. 27. A photometer transducer 96 includes a photo cell circuit of any functional type as shown diagrammatically in FIG. 28 and physically in FIG. 27. FIG. 28 shows photo transducer or photo cell 96 connected to logarithmic preamplifier 97.

Printed circuit cards 98 comprise the control and regulator electronic section of this device. Printed circuit cards 99 comprise the calculating and computing section of this device. Cards 98 and 99 are inserted in channel supports 101 and are connected by standard cables (not shown) and plugs 103.

E. Electronics

FIG. 28 is a block diagram of the electronic system. The essential components are the following:

1. Power Supply

The power supply furnishes the voltages necessary to operate the electronics and to energize the optical system light source. The regulation is such that the system is not affected by line voltage variations from 95 to 140 volts. The system can aslo operate on the 230V 50 cycle power line common in foreign countries.

2. Photo-Detector and Logarithmic Amplifier

These components detect the light scattered by the bacterial suspension. The analog output of the logarithmic amplifier equals the logarithm of the photodetector current in microamperes. The circuit is exceptionally stable and requires no adjustment over the life of the instrument.

3. Analog to Digital Converter

The light scatter signals from the analog amplifier are converted to a binary digital number by the Analog to Digital (A/D) converter. The converter employs a dual slope integration technique for A/D conversion. This technique insures high noise immunity and excellent stability.

4. Computer Unit

The digital form of the light scatter signal is now sent to the computer unit. The result is converted from a binary to a decimal number.

5. Printer Electronics

The result is then transmitted to the Printer Electronics which causes the computation to be printed out.

6. Cuvette Drive Electronics

This circuitry controls the stepper motor 84 which moves the cuvette carrier mechanism 46. Commands from the master control unit can start, stop or brake the motor 84.

7. Master Control Unit

On command from the operator through the switches on the front panel 72 the Master Control does the following:

Run command: The master control determines if the cuvette 12 is in place and the door 74 is shut. Then, if the Run button 81 is pressed, the unit synchronizes the advance of the cuvette with the A/D converter and the printer. After the last cuvette compartment is read, the master control returns the cuvette to the home position and feeds the printed tape 22 through the paper slot 70.

Standardize: If the standardize button 79 is pushed, a test tube 13 may be inserted into the port 64 in the right door 74 and the inoculum standardized. Pushing any other button returns the instrument to the ready state.

Reset: Pressing this button 87 aborts the test and returns the cuvette 12 to the home position.

Paper: Pressing the button 89 controls the feeding of paper 22 from the printer 100.

OPERATION

A. Preparation of the Standard Inoculum

The standard inoculum is a suspension of a pure bacteria in 0.90 gm percent sodium chloride which is between the limits of 1 to $3\times10^7$ viable cells per milliliter. This standard saline stock inoculum in an optically acceptable (i.e., clean, scratch-free) 16×125 mm round-bottom flint glass tube will give a 35° angle scattering signal of $-\log S$ between 2.2 ($1\times10^7$ cells per ml.) and 1.9 ($3\times10^7$ cells/ml when placed in the photometer. The photometer standardization meter 68 has a central region (occupying 40 percent of the total meter range) stating "correct inoculum range." Its two boundaries correspond to the two acceptable scattering limits. The left region of the meter (occupying 30 percent of the total meter range) states "under" and/or "add more organisms," while the right region (occupying the remaining 30 percent of the total meter range) states "over" and/or "dilute with saline."

The standard inoculum is prepared by transferring a colony or colonies of a given bacteria from a 16–24 hour agar plate into a 16×125 mm. standard saline inoculum tube 13 containing 6.0 ml. of 0.45 micron membrane filtered, sterile, 0.90 gm percent saline. A microbiological loop 24 is used for this purpose and the usual flaming procedures for sterility are employed.

Although the decision regarding the number of colonies to be placed into the saline tube in order to achieve the appropriate concentration range is ultimately a matter of practice with a wide variety of colony consistencies and sizes. Approximate guidelines relating the diameter of the colony to the number of such colonies can be developed to facilitate achieving the standard inoculum rapidly.

After loop transfer of colonies to the saline tube 13 (gently rubbing the loop on the inside of the tube just below the meniscus aids in releasing particularly sticky colonies from the loop), the tube 13 is flamed, screw-capped, vortexed for 15 seconds and placed in the inoculum port of the photometer lid. A white, vertical marker line on the upper part of the tube aids in alignment (i.e., white marker is aligned with a similar line located on the photometer lid). The standardize button 79 is depressed and the meter 68 needle equilibrium position noted. If the needle is within the standard inoculum range, the saline inoculum is ready for dilution and introduction into the cuvette. If the needle is in the "under" region, the tube 13 is removed from the photometer and additional colony(ies) added. If the needle is in the "over" region, sterile, filtered 0.90 gm percent saline (provided) is added to the tube stepwise until the inoculum has been diluted to within standard range.

B. Presentation of Standardized Inoculum to the Antimicrobial Panel

1. Loading the cuvette with antimicrobial discs

After selection of the desired panel of antimicrobial agents, the disc dispenser 14 is loaded by inverting it and inserting the appropriate cartridges 39 (mouth up) into the holes 19 of the dispenser 14. Care must be taken that the discs 16 of each cartridge 39 are properly packed (i.e., lying 90° to the long axis of the cartridge) and that a gap no longer than 3 mm exists between the top disc and the mouth of the tube. After all cartridges are loaded, the dispenser 14 is rotated 180° back to its normal upright position. The Krayton closure 34 is removed from a cuvette 12. With the dispenser 14 standing on a bench top (or suitable table), the cuvette 12 is inserted on the dispenser track and pushed in until the stop 45 is reached. The lever arm 51 of the dispenser is then depressed and released causing one disc 16 to be dispensed into each disc port 26 of the cuvette 12. The cuvette 12 is removed from the dispenser and the Krayton closure 34 firmly replaced, thereby resealing the cuvette.

2. Filling the Cuvette with Broth Inoculum (FIGS. 9–13)

Following standardization, 2.0 milliliters of the saline stock inoculum are transferred from tube 13 with a sterile pipette into a 20×125 mm tube 78 (flat-bottom, flint glass, 18–415 screw capped) containing 18.0 ml. of sterile, 0.45 micron membrane-filtered, eugonic broth (previously described). The usual microbiological procedure of flaming the mouths of the tubes is used and after introduction of the inoculum, the inoculated eugonic tube is capped. This tube 78 is then inverted gently several times to mix the contents, uncapped and immediately screwed in an upright position, into cuvette inoculum tube port P until the tube seats firmly against the Krayton gasket 32. The first step and succeeding steps in the proper filling of a cuvette with broth inoculum are illustrated in FIG. 9. Cuvette 12 is now gently rotated 180° in such a manner as to completely drain the contents of the inoculum tube 78 into cuvette reservoir R (FIG. 10). Cuvette 12 is placed with reservoir end wall 112 on a level surface 114. In this position the long axis of cuvette is perpendicular to the level surface as shown in FIG. 11. Cuvette 12 is now rotated 90° so that the broth inoculum drains from the reservoir into the interconnected distribution lobes 15 as shown in FIG. 12. This rotation is most easily accomplished by simply grasping the non-reservoir end of the cuvette 12 and lowering it to the level surface so that the backside 9 of the cuvette (on which the cuvette bracket B is located) rests on the level surface 114 as shown in FIG. 13. Draining is complete in 8 seconds after which the final rotation is performed. This rotation simply consists in rotating the cuvette 90° to an upright position (i.e., the position in which the was loaded with antimicrobial discs), resting on end wall bottom edges 116 and feet 118 under Reservoir R. It is quite important that the cuvette remain level during this final rotation and this is ensured by performing the rotation in such a manner that both ends of the cuvette remain in contact with the level surface during the rotation. Examination of the properly filled cuvette should reveal equal levels of broth inoculum in all chambers. The disc 16 in each tubular holder 29 should be just below the surface of the broth. In certain cases, discs 16 will not be lying flat, however, this will not present any problem as long as the disc is in contact with the broth.

C. Incubation/Agitation of the Loaded Cuvette

Immediately after the broth inoculum distribution in the antimicrobial disc loaded cuvette, the cuvette is placed in the incubator-shaker 30. The workload in the average clinical microbiology laboratory is probably large enough to require that a number of cuvettes be introduced into the incubator-shaker at once. It is recommended that if, for example, 10 bacterial isolates are to be examined per hour, the 10 standard inocula be prepared first after which the cuvettes are loaded and placed on a single rack of the incubator-shaker 30. They are then simultaneously incubated and agitated for the standard 3 hour period at 36°C. During the incubation period, the incubator-shaker can be briefly stopped in order to insert a second or third rack of cuvettes. After 3 hours of incubation/agitation, the rack of cuvettes is removed and brought to the photometer for reading.

D. Reading of the Cuvette

1. After opening the right door 74 of the photometer, the cuvette is placed on the photometer carriage 46 via its bracket B.

2. The door 74 is closed and the "run" button 81 depressed. The carriage 46 moves the cuvette 12 through the photometer analyzer 62 dwelling briefly at each chamber S for reading.

3. The 35° light scattering from each chamber $S_{1-12}$ is read and compared to the first chamber $S_c$ which receives no antibiotic and serves as the growth control. The sequence of events is as follows:

a. The control chamber $S_c$ is read and Log C* is calculated

\* $[A_x]_t$ = light scattering of test chamber $S_x$ with antibiotic after incubation time $t$.
$C_t$ = light scattering of control chamber after incubation time $t$.
$C_o$ = light scattering of initial (time $t = 0$) standard broth inoculum.

The initial inoculum concentration $C_o$ is an instrumental constant derived from the known initial inoculum in the first tube.

b. Log ($C_t/C_o$), the growth index, is now calculated by digitally subtracting log $C_o$ from Log $C_t$. The result is printed on paper tape or preprinted card.

c. Log $[A_1]_t$, the light scatter from the first unknown chamber $S_1$, is now read and Log $C_t/[A_1]_t$ is calculated.

The result is divided by Log ($C_t/C_o$) and printed on paper tape or preprinted card. The process is repeated for each chamber until all chambers have been read and the result printed out.

The net result of the computation is to rate on a 0–100 scale the inhibitory effectiveness of each antibiotic. For example, 0–50 might be a resistant rating, 65–100 a susceptible rating and 50–65 an intermediate rating.

4. The cuvette 12 is returned to its initial position and the control panel light signals the test to be over.

If sufficient growth (i.e., growth index less than 0.9) has occured during the 3 hour incubation period, the cuvette 12 may be re-incubated an additional period of time before accepting the final readings.

COMPUTING SYSTEM BLOCK DIAGRAM AND OPERATION

Figure 29:
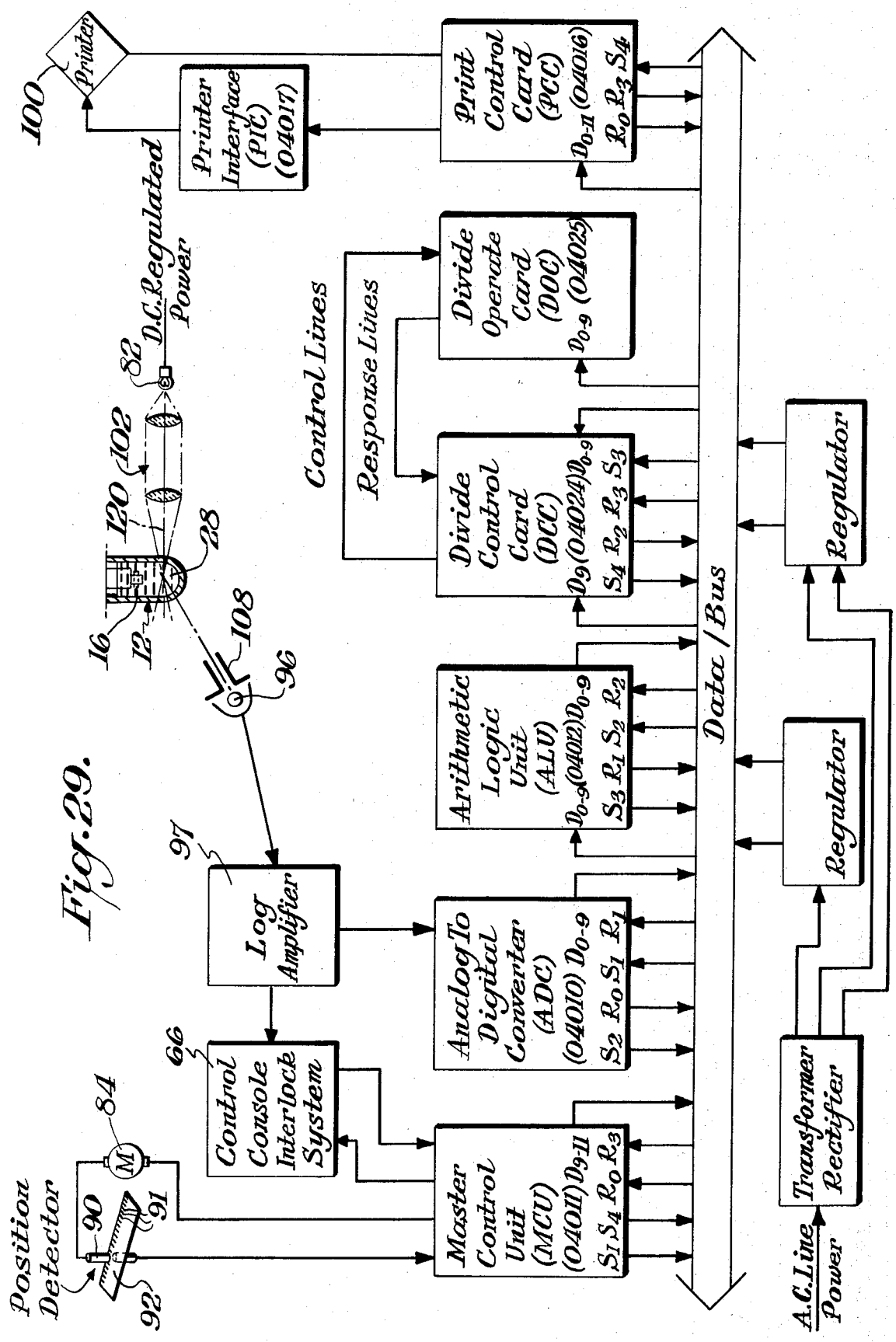
FIG. 29 is a schematic block diagram of the electronic and logic apparatus embodiment of this invention and used in performance of the method of this invention.

The analyzer instrument system electronics is comprised of a printed circuit data bus, Mother-Board, into which are plugged functional Printed Circuit cards as illustrated in block diagram FIG. 29. Each system function card is independent in its operation and utilizes a DATA/BUS system to transmit data and instructions between function cards.

Operation of the system starts at the Master Control Unit (MCU–04011). This functional card monitors the power supply regulators, the control console, the interlock system and the position detector. When power is first applied to the system, the Master Control Unit places a master clear signal onto the data bus. All cards plugged into the DATA/BUS monitor this signal and on receipt of a command on this line, clears all operations and reverts to a stand-by condition. Once power has been maintained for several seconds, the Master Control Unit monitors the control console and interlock system for a normal operating procedure. The interlock system requires that a cuvette 12 be in place, the door 74 closed and the light bulb 82 at full intensity. Having satisfied this condition, the Master Control Unit will now accept commands from the control console 66.

Commands from the control console 66 are placed on the DATA/BUS and directed to the appropriate operating unit by Select Line 1 or Select Line 4. Select Line 4 is directed to the print control card and through binary coding of data lines 9–12, commands printer operations. Select line 1 is directed to the Analog to Digital Converter to request initiation of a computational cycle.

When placed in a run mode, the Master Control Unit first transmits drive messages to the motor 84 which subsequently causes the cuvette 12 to traverse through the Light Beam 120. A position detector 90 mounted on the cuvette transport mechanism transmits messages back to the Master Control Unit to indicate when a cuvette test cell $S_c$ is located in the Light Beam 120. When this position is reached, the Master Control Unit places a zero on select Line 1 on the DATA/BUS to command the Analog to Digital Converter to sample the analog signal available at the photo detector log amplifier. Absolute control of the DATA/BUS is in turn passed over to the Analog to Digital Converter.

The Analog to Digital Converter ADC–04010 responds to the Master Control Unit by asserting response line 0. The Analog to Digital Converter now converts the analog signal from the log amplifier to its binary numerical equivalent. Having completed this process, the Analog to Digital Converter asserts Select Line 2 and presents on data lines 0–9 the binary value of the analog signal. Asserting this select line now passes control of the DATA/BUS to the Arithmetic Logic Unit.

The Arithmetic Logic Unit (ALU–04012) accepts the data line 0–9 and responds to the Analog to Digital Converter by asserting Response Line 1. The Arithmetic Logic Unit first determines whether the datum received is the control value, (i.e., signal from the first cell $S_c$ of the cuvette 12), or a test value. If the sample received is the control value, the growth index calculation of $G_t = \text{Log } C_o - \text{Log } C_t$ is performed. If the sample is a test sample, $S_{1-12}$, the inhibitory index calculation $I_t = \text{Log } [A_x]_t - \text{Log } C_t$ is performed.

At the completion of this calculation, the Arithmetic Logic Unit asserts Select Line 3 and passes control of the DATA/BUS to the Divide Control Card.

The Divide Control Card (DCC–04024) and the Divide Operate Card (DOC–04025) operate in conjunction to perform a normalizing divide calculation. The Divide Control Card has control over the Divide Operate Card, on which the actual divide calculation is performed. Having been selected by Select Line 3, the Divide Control Card responds on Response Line 2 and takes control of the DATA/BUS.

The Divide Control Card first makes the decision as to whether the data received is the control sample $S_c$ or a test sample $S_{1-12}$. In the case of the datum representing the growth index, the standard sample, the read only memory program converts the binary coded data to binary coded decimal. In the case of the datum representing an inhibitory index, the program performs the calculation $I_t/G_t$. Having completed the appropriate calculation, the Divide Control Card asserts Select Line 4 and data on data lines 0–9, passing control of the DATA/BUS to the Print Control Card.

The Print Control Card (PCC–04016) receives the data on data lines 0–9 and monitors a binary code on data lines 9–11. Having been selected by Select Line 4, the Print Control Card responds to the Divide Control Card by asserting Response Line 3.

The Print Control Card monitors the printer operation receiving from the printer coded synchronizing pulses. The data received from the DATA/BUS is compared with a printer timing cycle and the appropriate commands are transmitted to the printer by a Printer Interface Card.

Having completed the print cycle, a command is transmitted by a Print Control Card via the DATA/BUS to the Master Control Unit to initiate motor movement to the next cuvette station S. The Master Control Unit will transport the cuvette and re-initiate the cycle when a cuvette cell is in the path of the Light Beam. This process continues until the Master Control Unit receives an interlock signal indicating that the cuvette has passed beyond the light station, or an end of the cuvette signal. The end of cuvette signal causes the Master Control Unit to normalize the DATA/BUS and command the printer to discharge paper completing the test.

Figure 30:
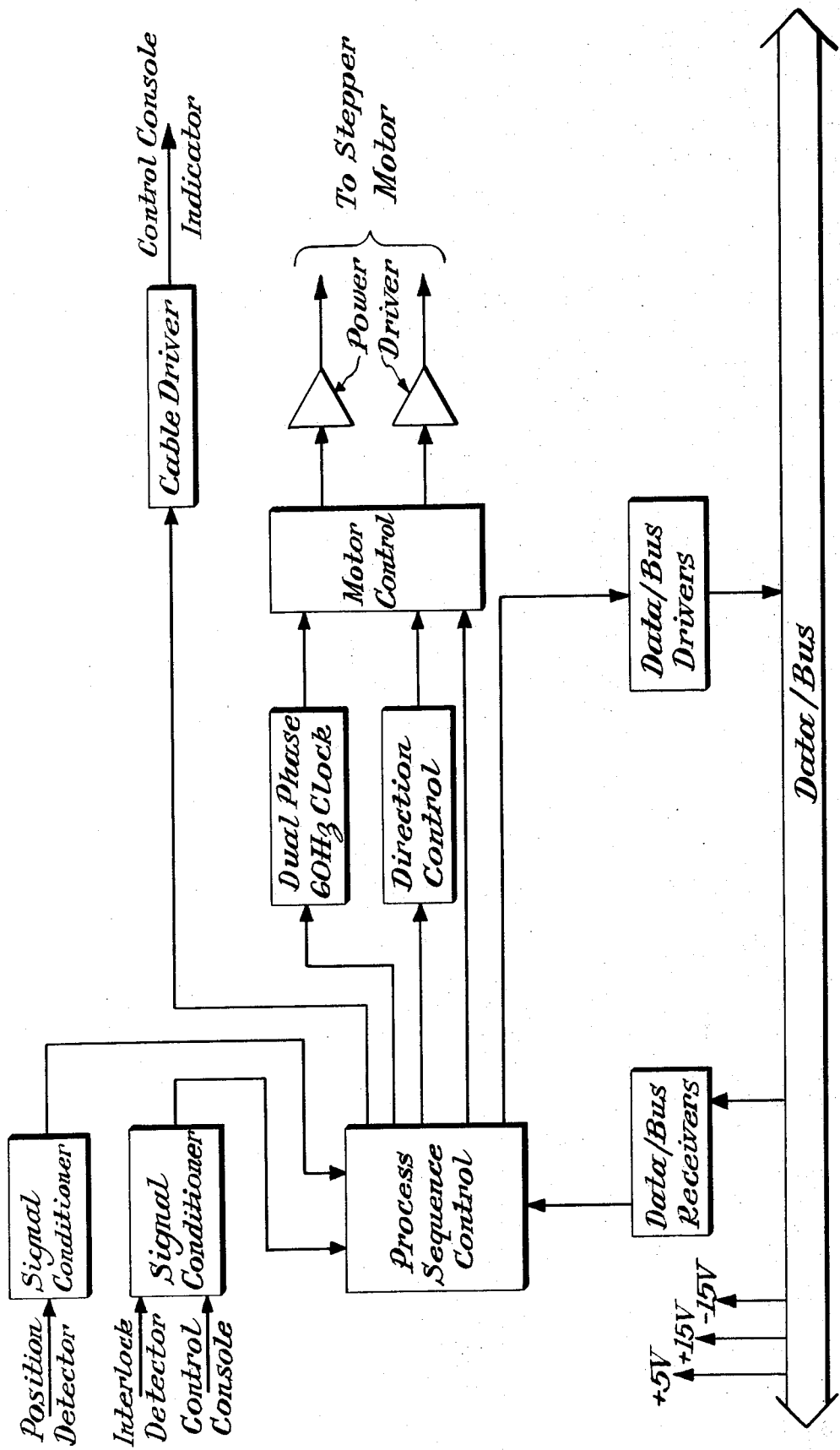
FIG. 30 is a schematic block diagram of the master control unit shown in FIG. 29.

It is the function of the Master Control Unit as shown in the operational block diagram FIG. 30 to drive and monitor the cuvette through the light beam and command calculation as each cuvette test cell is in position in the light path. To achieve this process, the Master Control Unit continuously monitors the operation of the DATA/BUS, the Interlock System and Control Console via RC network signal conditioners and the cuvette Position Detector via an active transistor signal conditioner. These operational conditions are monitored by the nand gate and Flip Flop circuits in the Process Sequence Control section. The state of the Process Sequence Control is transmitted to the control console by the Cable Driver and illuminated by solid state indicators, LED's on the Control Console.

The Interlock Detector system requires that the following conditions be satisfied prior to initiation of a test sequence.

1. The cuvette 12 has been placed on the cuvette hanger 44 and sits within the light beam 120.
2. The optical system lamp 82 is fully illuminated.
3. The door 74 has been completely closed sealing off external light.
4. The cuvette 12 is in the home or right most position on the carriage 46. Satisfying the interlock conditions activates the Control Console and the Process Sequence Control will respond to the run button 81. Likewise, the Dual Phase 60 Hz Clock is activated, and the Direction Control is set to indicate forward movement of the cuvette 12 through the light beam 120.

Depressing the run button 81 initiates a test sequence and the Process Sequence Control codes and asserts data lines 9, 10 and 11 and Select Line 4 indicating the initiation of a test sequence. The Print Control Card later described interprets this code. Response line 3 is monitored during this coding to indicate that the command was received and acted upon.

Assertion of Response Line 3 causes the Process Sequence Control to gate the Direction Control and Dual Phase 60 Hz Clock, through the Motor Control Circuits, providing low level TTL signals to the Power Driver Circuits. The Power Driver Circuits translate the low level signals to high voltage power pulses which drive the stepper motor 84 in the forward direction.

Located on the cuvette carriage 46 is a slide 92 having index slots 91. The slide 92 passes through a Position Detector mechanism 90 which provides a signal back to the Process Sequence Control to indicate when a test station of the cuvette is located in the light beam. At the acquisition of this signal, the Process Sequence Control disengages the Motor Control stopping the motor input. A one-shot in the Process Sequence Control is triggered providing a time delay before the next command is given. This time delay is sufficient to allow the cuvette 12 to come to a complete stop and to allow the Photometer 96 to stabilize its analog output. At the completion of this time delay, the Process Sequence Control issues a command on the DATA/BUS by asserting Select Line 1 indicating that a calculation can now be made. The Process Sequence Control monitors Response Line 0 as a return message indicating that the calculation has been started and that control of the DATA/BUS has been taken by the next logic module. Once Response Line 0 has been asserted, the Process Sequence Control disengages Select Line 1 and monitors the Busy Line of the DATA/BUS. The Busy Line indicates that a calculation is in process and that the cuvette 12 must be held securely in the light beam 120. Assertion of Response Line 3 causes the Process Sequence Control to activate the Motor Control, driving the cuvette forward to the next test station.

The Process Sequence Control responds to the depression of a Paper Feed switch by coding Data Lines 9, 10 and 11 and asserting Select Line 4 of the DATA/BUS. The Print Control Card interprets this coding.

Depressing the Standard button of the Control Console causes the Process Sequence Control to transmit a signal to the Control Console activating the meter circuit to display the analog level of the Photometer output.

The Reset button on the Control Console normalizes the Process Sequence Control which in turn, asserts the Master Clear line of the DATA/BUS. All logic units plugged into the DATA/BUS monitor this line and normalize to an idle state when a Master clear signal occurs.

Figure 31:
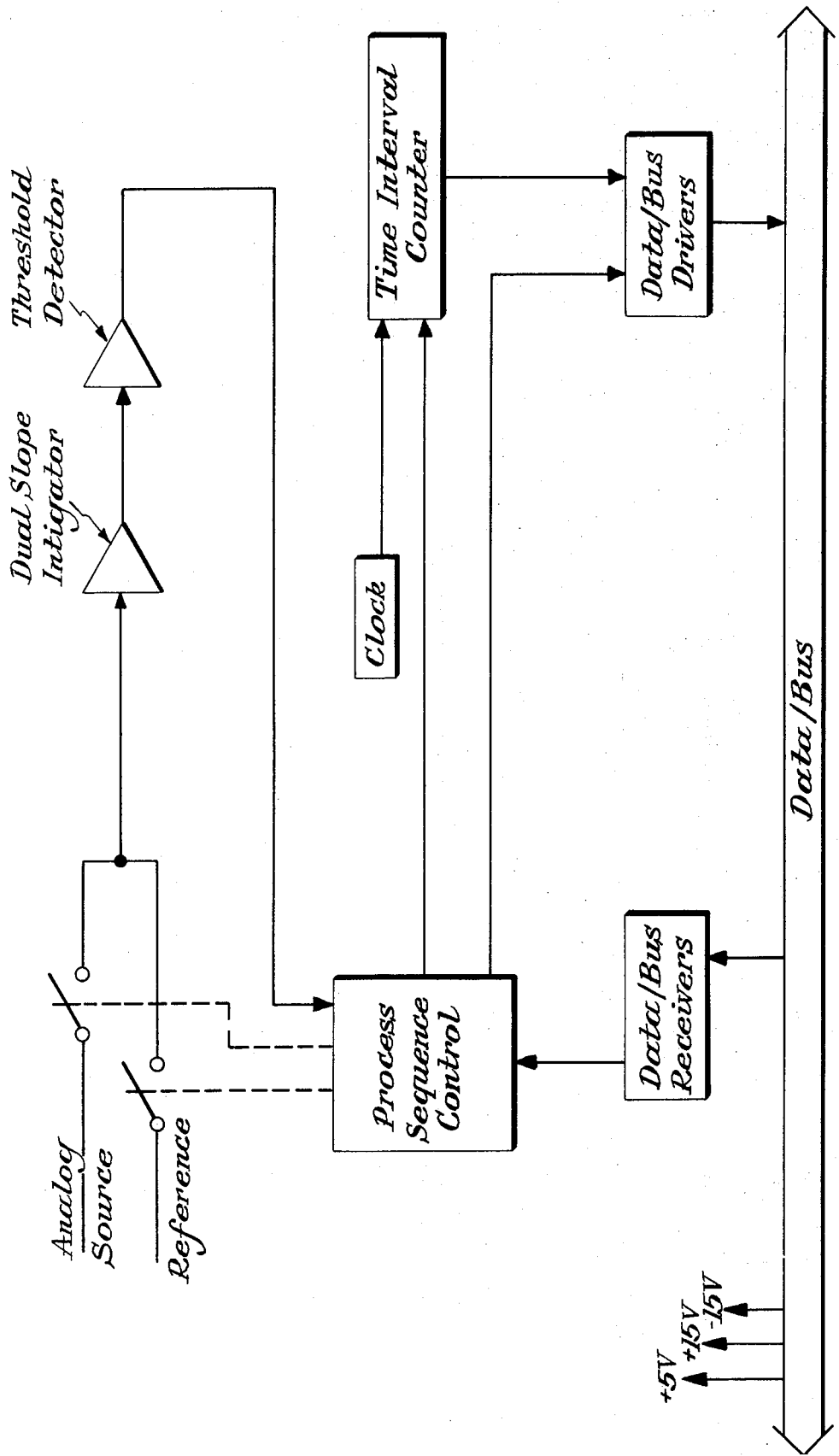
FIG. 31 is a schematic block diagram of the analog to digital converter shown in FIG. 29.

The Analog to Digital Converter as shown in the operational block diagram FIG. 31, monitors the DATA/-

BUS Select Line 1 and commences its process on command from this line. Having received the command to perform its conversion, the Analog to Digital Converter responds to the DATA/BUS by asserting Response Line 0.

The Process Sequence Control switches the analog source signal through an electronic FET switch to the dual slope integrator circuit. The analog source is connected to the charging network of the dual slope integrator for the period of two time constants to charge the capacitor in proportion to the level of the analog source voltage. At the end of this time, the Process Sequence Control switches the analog source off and connects to the dual slope integrator a reference supply of opposite polarity to discharge the capacitor. Simultaneously, the free running clock is gated on to count the time interval necessary to discharge the capacitor. The threshold detector senses the point at which the capacitor has reached zero charge, gating off the clock to the time interval counter. The time interval counter now contains a binary number which is equivalent to the analog signal and a complete analog to digital conversion has taken place. The Process Sequence Control gates this binary number onto the data lines of the DATA/BUS and asserts Select Line 2 commanding the next logic module to take the data and operate upon it. The data will be placed on the DATA/BUS until a response is sent back to the Analog to Digital Converter by Response Line 1. Upon receipt of the Response Line 1 command, the Analog to Digital Converter releases the DATA/BUS turning control of the DATA/BUS over to the next logic module.

Figure 32:
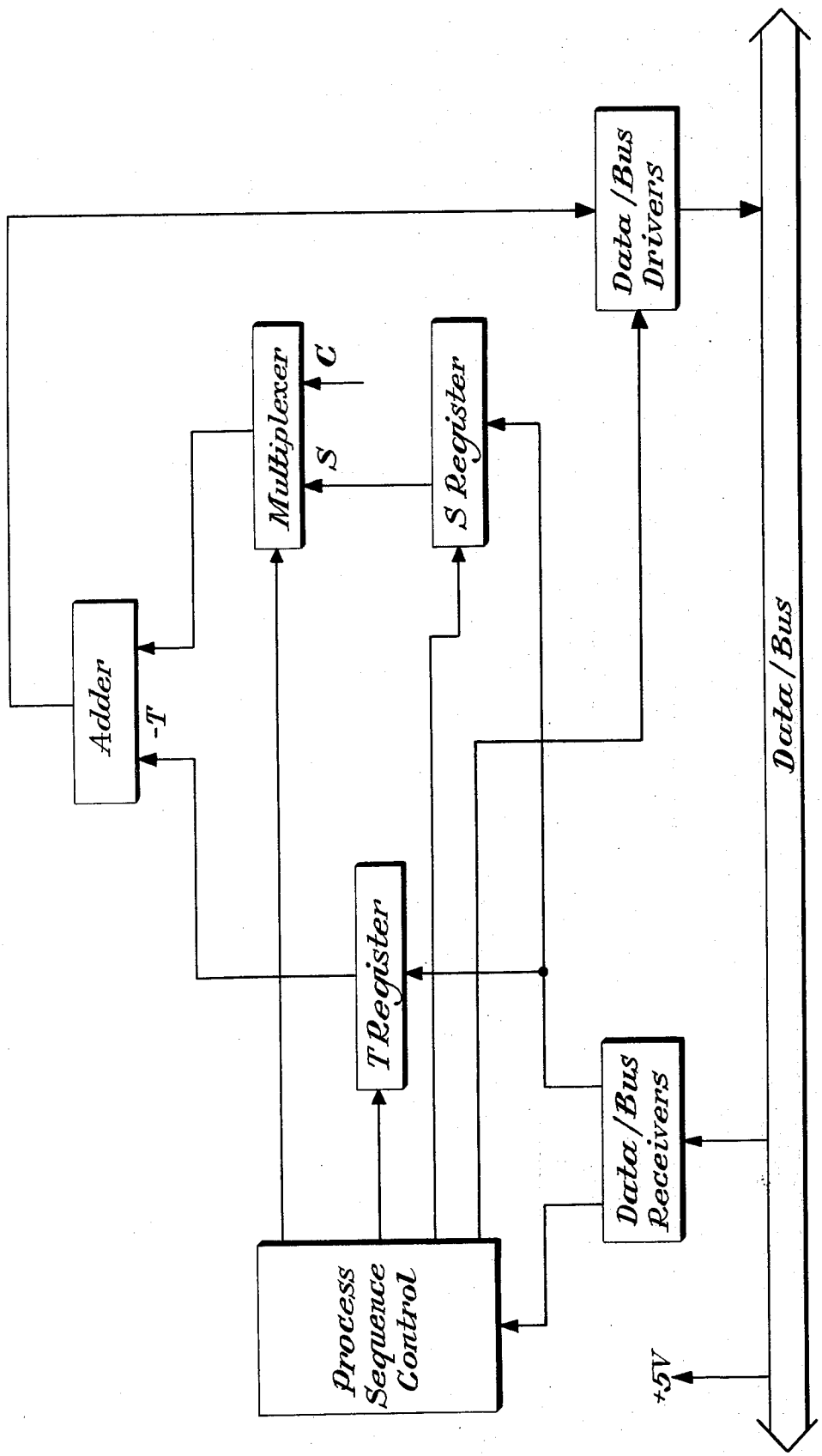
FIG. 32 is a schematic block diagram of the arithmetic logic unit shown in FIG. 29.

The Arithmetic Logic Unit as shown in Operational block diagram, FIG. 32, is commanded into operation by assertion of the DATA/Bus Select Line 2 and responds to this command by asserting Response Line 1.

The first data sample received by the Arithmetic Logic Unit is stored, by the Process Sequence Control, in the nine bit T Register. The negative value of this binary number is applied to one input of the Adder circuit. For this first calculation, the Multiplexer network is gated such that a constant, C, of 315 for example, is applied to the second input of the Adder circuit. The resultant calculation 315 - T is referred to as the Growth Index. A one-shot timer provides a time delay sufficient to permit the ripple carry of the adder network to settle. At the end of this time delay, the calculated sum is gated on the Data Line of the DATA/BUS and a command is given by assertion of Select Line 3. The data remains gated until a Response Line 2 command is received.

Subsequent data samples are stored in the Nine bit S Register on command from select Line 2. The Process Sequence Control now switches the Multiplexer network such that the contents of the S Register are applied to the Adder circuit. The resulting calculation S - T is referred to as the Inhibitory Index and is gated on to the DATA/BUS as previously described.

Figure 33:
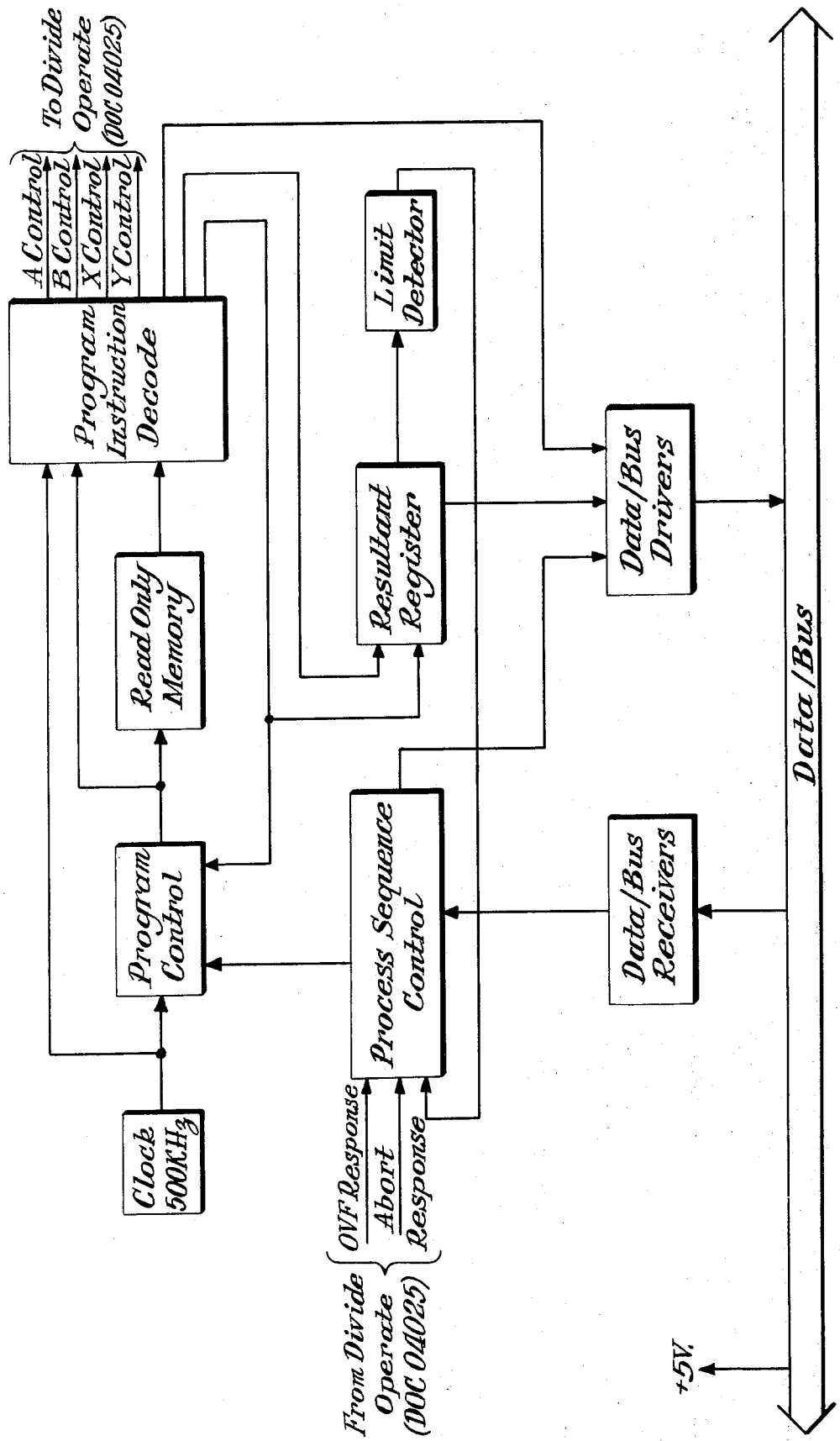
FIG. 33 is a schematic block diagram of the divide operate block shown in FIG. 29.
Figure 34:
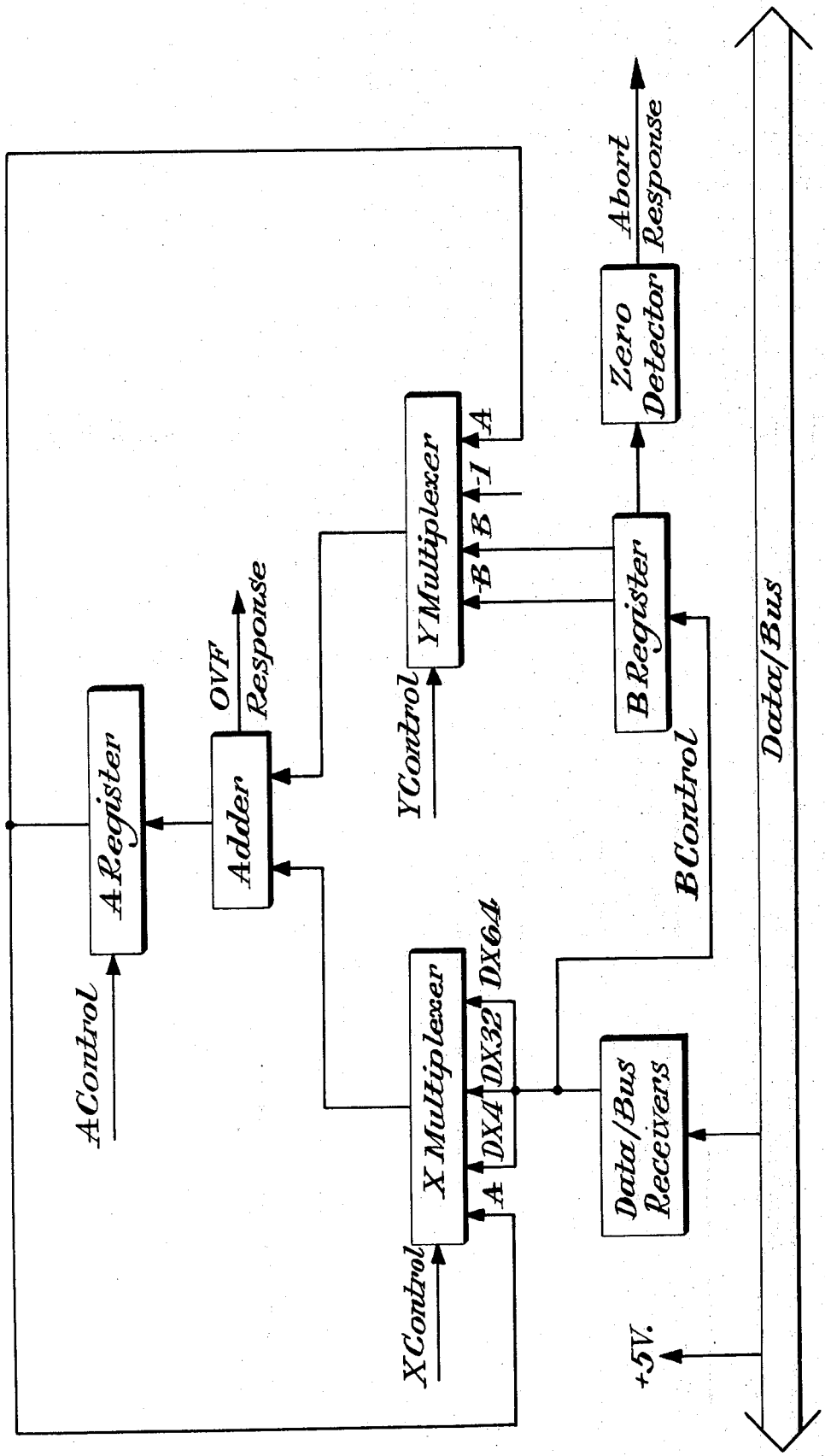
FIG. 34 is a schematic block diagram of the divide operate block shown in FIG. 29.
Figure 36:
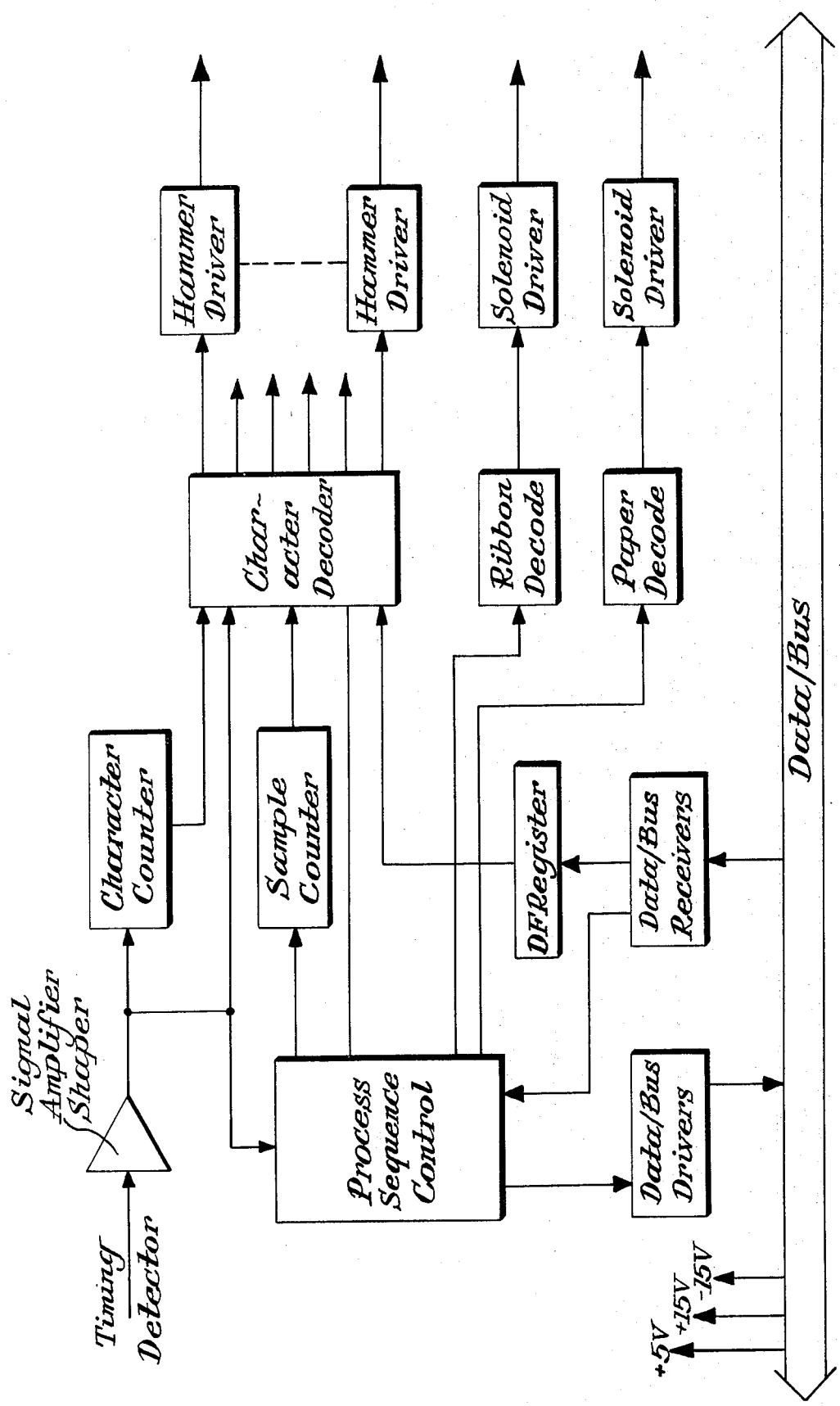
FIG. 36 is a schematic block diagram of an illustrative print control card shown in FIG. 29.

The operational block diagram, FIG. 33 and FIG. 34, for the Divide Control Card and Divide Operate Card will be treated as one unit since it is their combined operation that performs the normallizing divide operation. These two cards are connected to each other by means of a ribbon cable between the two cards at the back edge of each card.

The Divide Control Card has a Read Only Memory programmed to perform division by successive subtraction. Refer to FIG. 35 for the program listing, which is uniquely simple and advantageous. The sequence provided by the program in FIG. 35 advantageously performs a division in binary scaled in a base ten manner to achieve a resultant answer in a binary coded decimal. The Divide Operate Card has the registers and arithmetic data manipulation capabilities to execute the program.

The first data sample received is the Growth Index and is processed by Read Only Memory addresses 0–3. Sucessive data samples or Inhibitory Indexes are processed by addresses 5–9.

The Divide Control Card is commanded into operation by assertion of Select Line 3 and acknowledges Operation by asserting Response 2.

For the Growth Index, the Process Sequence Control forces the binary counter of the Program Control to memory address zero. The contents of the Read Only Memory are decoded by the Program Instruction Decode network and control commands are transmitted, via the ribbon cable, to the Divide Operate Card. The Growth Index is stored in the B register Flip Flops.

The contents of B register are transferred to the 16 Bit A Register through the Y Multiplexer, by adding +0 from the X Multiplexer at the Adder network. The X Multiplexer is next gated such that the contents of the A register are applied to one input of the Adder circuit and the Y Multiplexer is gated to apply −1 to the second input of the Adder circuit. The contents of the A Register is decremented to zero which is indicated by an OVF Response. With each calculation, the 12 bit Binary Coded Decimal (BCD) Resultand Register is incremented. When the OVF Response is detected, the Process Sequence Control unit terminates the Read Only Memory program, forcing the Program Control to memory location 4, which contains a Pause instruction. The Resultant Register is BCD equivalent of the B Register.

The Process Sequence Control next gates the Resultant Register on the Data Lines of the DATA/BUS and asserts Select Line 4. On receipt of a Response Line 3 command, the Divide Control Card releases the DATA/BUS.

For an Inhibition Index, the Process Sequence Control forces the Program Control to memory address 5. The first three steps of this program multiplies the data (D) from the DATA/BUS by $100_{10}$. The data (D) is rotated through the X Multiplexer in three steps and the A Register is gated through the Y Multiplexer to perform the following calculation:

$$(D \times 4_{10}) + (D \times 32_{10}) + (D \times 64_{10}) = (D \times 100_{10}) = A$$

The X Multiplexer is next gated to apply the contents of A to the Adder circuit and the Y Multiplexer is gated to apply −B to the Adder network. The calculation A − B is repeatedly performed until an OVF Response is generated, terminating the calculation as previously described. The Resultant Register, which is incremented with each summation, contains the BCD equivalent of the calculation:

$$D \times 100/B$$

The Zero Detector on the Divide Operate Card monitors the contents of the B Register for a Growth Index value of zero, to prevent the possiblilty of dividing by zero. Should a zero be detected, the Abort Response signal causes the Process Sequence Control to first transmit the zero value to the next logic module in the normal manner on the DATA/BUS. The first Inhibitory Index Value received by the Divide Control Card, causes the Process Sequence Control to assert the Master Clear line of the DATA/BUS, normalizing all logic modules and aborting the test.

The calculation of the normalized Inhibitory Index is truncated within the scale of 0–100. Should the calculation reach a value of 100 in the Resultant Register, the Limit Detector forces an OVF Response at the Process Sequence Control, terminating, in a normal manner, the program.

A printer operational block diagram, FIG. 35, is commanded by the assertion of Select Line 4 and coding of data lines 9–11. Data line codes are interpreted by the Print Control Card as follows:

| $DL_9$ | $DL_{10}$ | $DL_{11}$ | CODE COMMAND |
|---|---|---|---|
| 0 | 0 | 1 | PAPER FEED |
| 1 | 0 | 1 | RED RIBBON |
| X | 1 | X | PRINT CHARACTER ROW-FEED PAPER |

The Print Control Card responds by asserting Response Line 0 for the first two code commands and by asserting Response Line 3 for the latter two code commands. The data from the DATA/BUS Receivers is stored in the DF Register Flip Flops on the assertion of Select Line 4 and Print Character Ros command. The Print Control Card receives magnetic head timing signals from the character drum of the printer. These pulses are amplified and shaped with an operational amplifier and counted with a binary counter. Each count code corresponds to a row of characters on the printer drum. A single reset pulse is received from the printer each revolution of the print drum. This reset pulse synchronizes the Character Counter and the Process Sequence Control unit. Once synchronized, the Process Sequence Control gates the Character Decoder gates to begin the comparison of the character counter and the DF Register.

When coincidence occurs, a low level TTL signal is transmitted to the appropriate column Hammer Driver. The Hammer Driver consists of a transistor capable of energizing the hammer solonoid.

Each print command is counted in the sample counter, which is similarly compared by the Character Decoder and printed with the sample value. The ribbon and paper feed solonoids are controlled by the Process Sequence Control. These solonoids are energized by power transistors in the respective decoder.

We claim:

1. A method of determining the inhibitory effectiveness of a number of different antimicrobial agents on the growth of a bacteria in a liquid sample comprising the steps of dividing said sample into a number of samples, simultaneously inoculating said samples with one each of said antimicrobial agents whereby said antimicrobial agents elute into said samples, maintaining one of said samples free of an antimicrobial agent for use as a control sample, incubating the samples for a brief period to develop potentially significant differences in the growth rate of the bacteria in each of them, agitating the incubated samples to obtain a uniform suspension of the bacteria grown in each of them, successively photometrically reading a light scattering characteristic in a limited portion of the uniform suspension in each sample indicative of the bacteria content in each of the samples, completing said readings for all of said samples within a brief time interval whereby the differences in said growth rate relative to time in said readings are substantially nullified and computing a comparison of said readings of the antimicrobial agent inoculated samples with the control sample to determine the relative effectiveness of each of the antimicrobial agents.

2. A method as set forth in claim 1, wherein the elution of the antimicrobial agents during said incubation is standardized and said agitation is performed by uniform shaking during said incubation.

3. A method as set forth in claim 1 wherein said photometric reading is accomplished by a light scattering method.

4. A method as set forth in claim 3 wherein said light scattering method utilizes a light source.

5. A method as set forth in claim 4 wherein said light is white light.

6. A method as set forth in claim 1 wherein said samples are deposited, incubated and photometered in a transparent compartmented container.

7. A method as set forth in claim 6 wherein said samples are inoculated with antimicrobial agents by a ganged antibiotic disc dispenser.

8. A method as set forth in claim 7 wherein said samples are incubated in a shaking incubator.

9. A method as set forth in claim 8 wherein said incubation is performed for about 3 hours.

10. A method of determining the inhibitory effect of a number of different antimicrobial agents on the growth of a bacteria in a liquid sample comprising the steps of dividing said sample into a number of samples, inoculating said samples with one each of said antimicrobial agents, maintaining one of said samples free of an antimicrobial agent for use as a control sample, uniformly incubating said samples for a brief period to develop potentially significant differences in the growth rate in each of them, agitating the incubated samples to obtain a uniform suspension of the bacteria grown in each of them, directing a light beam through a limited portion of the uniform suspension in each of said samples, photometrically determining the light scatter from each of said samples in said beam, and computing a comparison of said reading of the antimicrobial agent inoculated samples with the control sample to determine the relative effectiveness of each of the antimicrobial agents.

11. A method as set forth in claim 10 wherein said computing is performed in a photometric analog mode which is immediately converted to digital.

12. A method as set forth in claim 11 wherein said digital computing is performed in binary.

13. A method as set forth in claim 12 wherein said binary digital computing is also logarithmic.

14. A method as set forth in claim 12 wherein a sequence of operations are controlled by a read only memory whereby a division in binary is performed and converted to a base ten number to achieve a resultant answer in a binary coded decimal.

15. A method as set forth in claim 10 wherein the elution of the antimicrobial agents during said incubation is standardized by uniform shaking during said incubation.

16. A method as set forth in claim 15 wherein said samples are incubated in a shaking incubator.

17. A method as set forth in claim 10 wherein said light scattering method utilizes a white light source.

18. A method as set forth in claim 17 wherein said light is white light.

19. A photometric apparatus for determining the relative differences in reaction inhibition effectiveness of a number of inhibitory agents in a solution by determining their effect on the light scattering characteristics of a number of different solution samples comprising a light source, a carriage disposed adjacent said light source, a removable transparent compartmented container having a plurality of chambers for holding each of said sample solutions, said carriage being constructed and arranged for holding and moving said compartmented container past said light source in a path of travel, said chambers each having a wall which is optically transparent at a predetermined acute angle to said light source and to the forward light scatter caused in said solution in said chamber by said light source, rapid indexing means on said carriage for successively positioning each of said chambers at a predetermined position for a brief time with said wall at said predetermined acute angle in front of said light source whereby light scattering readings at said predetermined acute angle are obtained and whereby the differences in said readings relative to time are substantially nullified, a light meter disposed opposite said light source from said predetermined position and spaced therefrom on the opposite side of said path of travel of said compartmented container, said light meter being disposed at said predetermined acute angle relative to the beam of said light source passing through said chambers whereby it reads the amount of light scattered by each of said samples at said predetermined acute angle in said brief time, and computing means connected to said light meter for computing and calculating the relative light scattering characteristics of the solutions in each of said chambers in said brief time whereby the inhibitory characteristics of said inhibitory agents are determined.

20. A photometric apparatus as set forth in claim 19 wherein said indexing means comprises slots in said carriage and photoelectric means for successively stopping each of said samples in front of said light source.

21. A photometric apparatus as set forth in claim 19 wherein said light source comprises a white light source.

22. An apparatus as set forth in claim 19 wherein said computing means comprises a photometric analog immediately converted to digital computing means.

23. An apparatus as set forth in claim 22 wherein said digital computing means comprises a binary digital computer means.

24. An apparatus as set forth in claim 23 wherein said binary digital computer means is logarithmic to facilitate obtaining relative values.

25. An apparatus as set forth in claim 23 wherein a read only memory is provided having a sequence of operations for performing a division in binary scaled in a base ten manner to achieve a resultant answer in a binary coded decimal.

26. A photometric apparatus as set forth in claim 19, wherein a holding finger is disposed in each of said chambers for holding said inhibitory agent and a port in each of said chambers for inserting said inhibitory agents.

27. An apparatus as set forth in claim 26, wherein said ports are capable of simultaneous openings to facilitate rapid insertion of said inhibitory agents.

28. An apparatus as set forth in claim 19, wherein said compartmented container has a plurality of test lobes, and said test lobes having a curved shape to facilitate the obtaining of forward light scatter readings.

29. A photometric apparatus as set forth in claim 19, wherein said chambers are interconnected by passageways of relatively small cross-sectional area whereby said sample solutions are rapidly equally divided between the chambers.

* * * * *